United States Patent
Lundin et al.

(10) Patent No.: US 11,633,786 B2
(45) Date of Patent: Apr. 25, 2023

(54) FEEDSTOCK FOR AN ADDITIVE MANUFACTURING METHOD, ADDITIVE MANUFACTURING METHOD USING THE SAME, AND ARTICLE OBTAINED THEREFROM

(71) Applicant: Höganäs AB (Publ), Höganäs (SE)

(72) Inventors: Eva Lundin, Ödåkra (SE); Magalie Darnis, Höganäs (SE); Sofia Nilsson, Höganäs (SE); Anders Flodin, Chapel Hill, NC (US)

(73) Assignee: HÖGANÄS AB (PUBL), Höganäs (SE)

( * ) Notice: Subject to any disclaimer, the term of this patent is extended or adjusted under 35 U.S.C. 154(b) by 784 days.

(21) Appl. No.: 16/461,193

(22) PCT Filed: Nov. 15, 2017

(86) PCT No.: PCT/EP2017/079298
§ 371 (c)(1),
(2) Date: May 15, 2019

(87) PCT Pub. No.: WO2018/091517
PCT Pub. Date: May 24, 2018

(65) Prior Publication Data
US 2019/0308241 A1 Oct. 10, 2019

(30) Foreign Application Priority Data
Nov. 15, 2016 (EP) ...................................... 16198874

(51) Int. Cl.
*B22F 10/10* (2021.01)
*B29C 64/165* (2017.01)
(Continued)

(52) U.S. Cl.
CPC ............ *B22F 10/10* (2021.01); *B29C 64/165* (2017.08); *B29C 64/218* (2017.08); *B22F 1/103* (2022.01);
(Continued)

(58) Field of Classification Search
CPC ....................................................... B22F 10/10
See application file for complete search history.

(56) References Cited

U.S. PATENT DOCUMENTS

| 5,121,329 A | 6/1992 | Crump |
| 5,738,817 A | 4/1998 | Danforth et al. |

(Continued)

FOREIGN PATENT DOCUMENTS

| CN | 105713362 A | 6/2016 |
| EP | 3558565 B1 | 6/2022 |

(Continued)

OTHER PUBLICATIONS

JPH05156309 Translation (Year: 1993).*
(Continued)

*Primary Examiner* — Jacob T Minskey
*Assistant Examiner* — Adrien J Bernard
(74) *Attorney, Agent, or Firm* — Buchanan Ingersoll & Rooney P.C.

(57) ABSTRACT

A feedstock for a 3D manufacturing process, in particular a Fused Filament Fabrication process. The feedstock includes (P) sinterable particles made of a metal, metal alloy, glass, ceramic material, or a mixture thereof; and (B) a binder composition including (b1) 5-15% by weight, relative to the total weight of the binder composition, of a polymeric compatibilizer, and (b2) 85-95% by weight, relative to the total weight of the binder composition, of a polymeric binder component, the polymeric binder component being selected from the group consisting of (b2-1) a polymer mixture or
(Continued)

polymer alloy, the mixture or alloy including at least a first and a second polymer; (b2-2) one, two or more block copolymers, including at least a first polymer block and second polymer block; and (b2-3) mixtures of (b2-1) and (b2-2), wherein the amount of sinterable particles P is 40 Vol % or more of the composition.

18 Claims, 7 Drawing Sheets

(51) Int. Cl.
  *B29C 64/218* (2017.01)
  *B33Y 10/00* (2015.01)
  *B33Y 30/00* (2015.01)
  *B22F 3/10* (2006.01)
  *B22F 1/103* (2022.01)

(52) U.S. Cl.
  CPC ......... *B22F 3/1021* (2013.01); *B22F 2998/10* (2013.01); *B33Y 10/00* (2014.12); *B33Y 30/00* (2014.12); *C04B 2235/6026* (2013.01)

(56) References Cited

U.S. PATENT DOCUMENTS

| | | | |
|---|---|---|---|
| 5,900,207 | A | 5/1999 | Danforth et al. |
| 6,048,954 | A | 4/2000 | Barlow et al. |
| 6,329,480 | B1 | 12/2001 | Uchiumi et al. |
| 6,555,637 | B1 | 4/2003 | Hamada et al. |
| 10,487,168 | B2 | 11/2019 | Inoubli et al. |
| 2012/0033002 | A1 | 2/2012 | Seeler et al. |
| 2015/0080495 | A1 | 3/2015 | Heikkila |
| 2015/0125334 | A1 | 5/2015 | Uetani et al. |
| 2016/0312022 | A1 | 10/2016 | Niessner et al. |
| 2016/0319120 | A1 | 11/2016 | Niessner et al. |

FOREIGN PATENT DOCUMENTS

| | | | |
|---|---|---|---|
| JP | H05156309 | A | 6/1993 |
| JP | 2001-049070 | A | 2/2001 |
| JP | 2012-021172 | A | 2/2012 |
| KR | 10-2016-0127538 | A | 11/2016 |
| RU | 2145269 | C1 | 2/2000 |
| WO | 9530503 | A1 | 11/1995 |
| WO | 2015006697 | A1 | 1/2015 |
| WO | 2015/065826 | A1 | 5/2015 |
| WO | 2015091815 | A1 | 6/2015 |
| WO | 2015188307 | A1 | 12/2015 |
| WO | 2016102802 | A1 | 6/2016 |

OTHER PUBLICATIONS

Office Action dated Sep. 15, 2020, by the INPI in Brazilian Patent Application No. BR112019009407-5 and an English Translation of the Office Action. (9 pages).
International Preliminary Report on Patentability (Form PCT/IB/373) and the Written Opinion of the International Searching Authority (Form PCT/ISA/237) dated May 21, 2019, by the International Bureau of WIPO, in corresponding International Application No. PCT/EP2017/079298, (7 pages).
International Search Report (PCT/ISA/210) dated Dec. 15, 2017, by the European Patent Office as the International Searching Authority for International Application No. PCT/EP2017/079298.
Written Opinion (PCT/ISA/237) dated Dec. 15, 2017, by the European Patent Office as the International Searching Authority for International Application No. PCT/EP2017/079298.
Office Action dated Jul. 21, 2021, by the Federal Public Service Ministry of Economy National Institute of Industrial Property in Brazilian Patent Application No. BR112019009407-5 and an English Translation of the Office Action. (9 pages).
Office Action dated Sep. 28, 2021, by the Japanese Patent Office in corresponding Japanese Patent Application No. 2019-525778, and an English Translation of the Office Action. (8 pages).
Notice of Allowance dated Mar. 7, 2022, by the Korean Intellectual Property Office in corresponding Korean Patent Application No. 10-2019-7017221, and an English Translation of the Office Action. (3 pages).
Office Action dated Oct. 19, 2022, by the Mexican Institute of Industrial Property (IMPI) in corresponding Mexican Patent Application No. MX/a/2019/005324, and an English Translation of the Office Action. (6 pages).

* cited by examiner

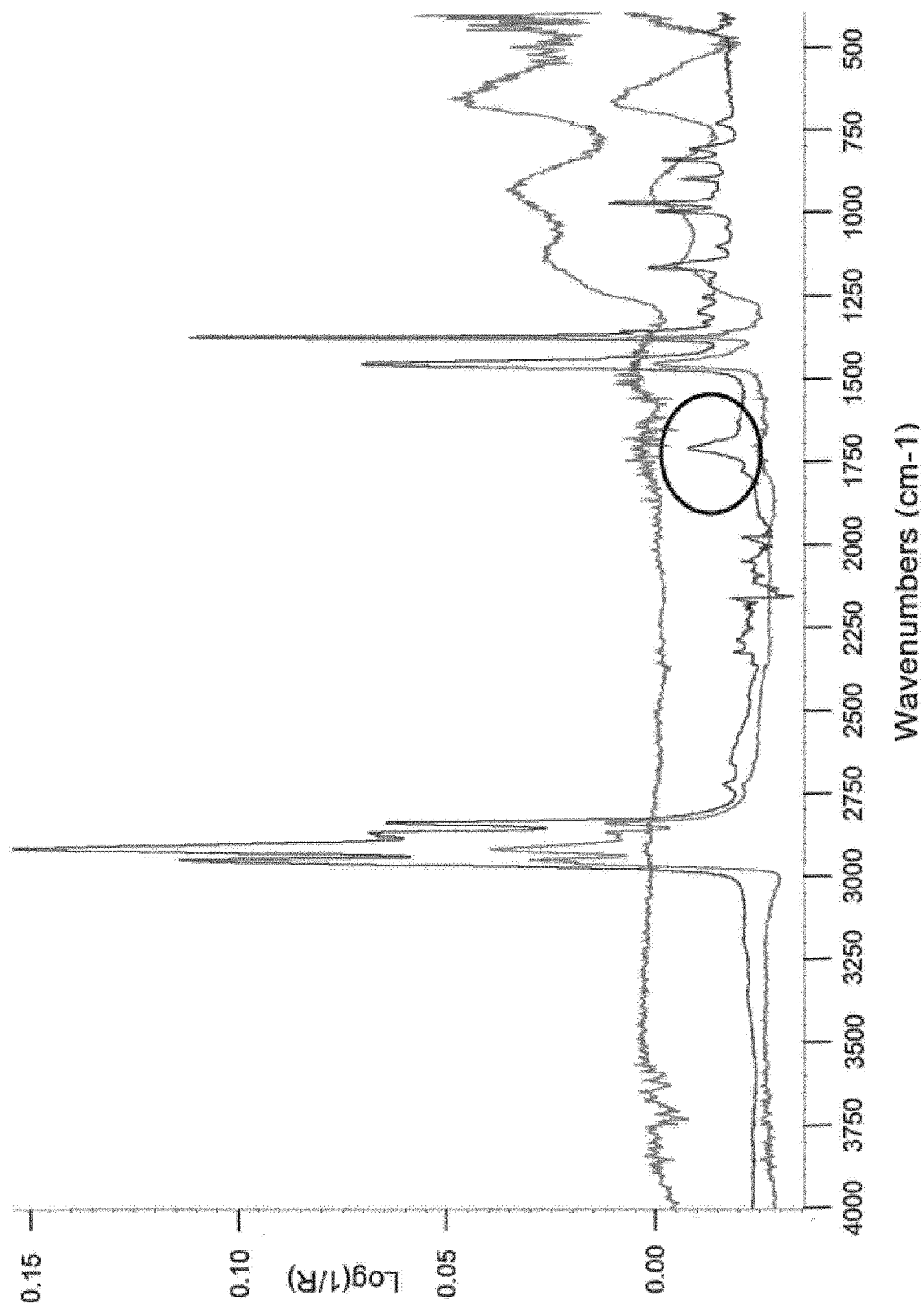

FEEDSTOCK FOR AN ADDITIVE MANUFACTURING METHOD, ADDITIVE MANUFACTURING METHOD USING THE SAME, AND ARTICLE OBTAINED THEREFROM

DESCRIPTION OF RELATED ART

Conventionally, parts made of solid and hard materials, such as metals, steels or ceramics, have been produced by subtractive manufacturing processes, e.g. machining. Specific shapes have been realized by cold and hot working processing methods, e.g. forging. These methods are however complex, require large machinery and are time consuming, and are thus generally more suitable to produce mass-produced articles and less suitable to prepare customized articles in a short time.

In the area of customized articles, rapid prototyping/rapid manufacturing has been developed. This area is of growing interest for many applications, as customized articles can be produced by computer-assisted equipment, such as laser cutting, laser sintering, etc. Rapid prototyping and rapid manufacturing is realized in a number of ways, including additive and subtractive techniques.

In recent years, various additive manufacturing processes have come to light. These processes have the general advantage that the material is more efficiently utilized as compared to subtractive manufacturing, and in many instances shapes can be realized that are not as such available via subtractive manufacturing processes. In particular the field of so-called "3D printing" is of growing commercial interest, as it allows the computer-assisted generation of solid parts with precise geometry and shape. 3D printing also offers consumers the ability to produce individualized and customized items in a short time. Also for industry, the rapid production of prototypes or the manufacture of items that otherwise cannot be produced cost-efficiently or due to technology constraints is of interest. Additive manufacturing methods thus continue where conventional manufacturing methods fail to deliver.

One type of additive manufacturing method is selective laser sintering (SLS). Herein, layers of an article are manufacturing layer by layer, by sintering the top layer and subsequently providing further powder, again followed by sintering. In a related process, metal powder particles are bound together by selectively applying an adhesive to a layer of metal particles, followed by additional layers of metal powder and again selective deposition of binder/glue material (binder jetting). These processes however require a large amount of metal powder that is subsequently discarded or needs to be recycled.

More economical is the fused filament fabrication method (FFF), also known as "fused deposition modelling" (FDM). In this additive manufacturing technology, a 3-dimensional object is built up by extruding a filament through a nozzle of an extruder to form layer of the feedstock on a base. The filament is generally a thermoplastic material. The nozzle of the extruder head is typically heated to make the filament soft and extrudable, and then the extrusion head forms layer by layer of the feedstock on a base. The feedstock generally hardens and solidifies after extrusion. In order to form each layer, the extrusion head is driven by motors to move the base and/or the extrusion nozzle (dispensing head) relative to each other in a predetermined patterned along the x-, y- and z-axis. The FFF-process was first described in U.S. Pat. No. 5,121,329.

FFF processes are today mainly applied to form 3-dimensional objects made from a thermoplastic material. In such a case, the object is readily printed in a 3D printer. Such devices are commercially available.

However, all-thermoplastic materials do have certain drawbacks. The manufactured object is generally not stable under high temperature, does not have high strength, and the optical appearance is often not satisfactory. It is thus desired to expand the field of additive manufacturing, and in particular FFF, to the production of objects having high heat stability, strength and good optical appearance, such as realized in objects made from metals, alloys, ceramics or glass.

Due to their inherent brittleness, such materials are however are not extrudable. The manufacture of objects made from such materials is thus generally only possible by providing particles of the materials in a binder system that is extrudable or can otherwise be processed, such as in Metal Injection Molding (MIM). A drawback is however then the need to remove the binder system and to fuse the particles, typically by heat treatment, to form the desired object.

In a Fused Filament Fabrication method employing such a particle-filled filament feedstock comprising the particulate material and a thermoplastic binder, first of all a preliminary object is formed by "printing" the filament, thereby forming the layered structured object (also referred to as "green body"). Subsequently, the binder is removed ("debinding") to obtain a so-called "brown body", and subsequently the particles are fused to obtain the final product. Such a process is for instance described in WO 2015/006697.

The binder composition usually comprises a thermoplastic material. As examples, U.S. Pat. Nos. 5,738,817 and 5,900,207 can be cited, describing a fused deposition modelling process for making an article, using a mixture of a particulate composition dispersed in a binder. The particulate composition comprises ceramic materials, metals, metal alloys and/or steels. The binder consists of a polymer, a wax, an elastomer, a tackifier and a plasticizer.

US 2012/0033002 describes a FFF method using a mixture of a thermomagnetic powder and a binder system. The binder system comprises polymers like polyesters, polysulfones, poly(ethersulfones) and styrene copolymers. This system requires very high temperatures for removing the binder in the debinding step.

Feedstocks for a fused filament fabrication method are also commercially available. These are mainly based on binders including polylactic acid or ABS (acrylonitrile butadiene styrene) copolymers. The only currently available feedstock for a FFF method able to provide 99% metal (copper) parts is Filamet™, obtainable from The Virtual Foundry, which contains copper particles and uses a polylactic acid as binder phase.

A feedstock for an additive manufacturing process, in particular a fused filament fabrication process that ultimately shall provide an object made from a heat-resistant material such as metals, alloys, glass, ceramics etc., must have a delicate balance of properties. These include the following:

The binder system must be debindable, i.e. the polymeric compounds must be removable, e.g. by heat treatment, solvent extraction or selective reaction using gaseous catalysts, substantially without leaving deposits between the particles making up the sintered body as these may lead to distortions and/or lead to lower strength at the boundaries between the particles;

For a FFF method, the feedstock must be printable through a printing head at an appropriate temperature;

If it is desired to store the feedstock in filament form and have it ready for use in a commercial 3D printer, it is preferable if the feedstock could be stored on spools having a relatively small radius, such as 2-10 cm, so that the spools could be easily shipped and sold without requiring too much space in the distribution chain and the final package sold to the user. For such an application, the feedstock thus should be sufficiently cohesive and flexible in order to allow spooling of the filament on a spool (spoolability), and also should be de-spoolable, generally at room temperature, without breaking;

For FFF applications, the feedstock must be extrudable to form a filament having sufficient strength in order to allow storing and shipping;

The produced green body must have sufficient cohesive properties and strength (green strength) to allow removal from the support and subsequent treatment steps for removing the binder to obtain a brown body;

The brown body obtained after the debinding treatment must have sufficient strength in order to maintain the integrity of the structure and avoid collapse before the sintered product is formed, in particular for complex and not self-supporting shapes;

The binder system must be able to sufficiently disperse the sinterable particles in a large volume percentage in order to reduce shrinkage during the subsequent debinding and sintering steps;

The layers of the filament produced in the additive manufacturing product, i.e. the different layers of the green body, need to have sufficient adhesive properties in order to not fall apart upon handling;

The feedstock needs to be able to be extruded ("printed") by the printer without smearing and attaching to the print head, and furthermore must break off when flow is stopped at the print head moved, so that the cohesiveness of the filament must also not be too strong;

The feedstock should have such properties that during debinding and sintering, in basically all dimensions, a similar magnitude of shrinkage is obtained without full collapse or distortion of the part. This allows obtaining a sintered part having a high relative density. Further, if the feedstock is densely printed (high infill), i.e. substantially without gaps and voids between the different layers (or filaments) of feedstock in the green part and/or with high wall thickness, a more solid sintered part is obtained. Conversely, if the printing of the green part is conducted such that the infill is low, lightweight yet rigid structures and high strength can be obtained). There is thus a desire for a versatile feedstock that can provide a sintered part with high relative density, as such a feedstock is able to provide solid parts and/or sintered parts with delicate/complicated structures having a high strength.

The binder system must be stable at print temperature in order to avoid decomposition and/or generation of fumes.

Developing a feedstock and binder system that is suitable, in particular for an FFF method, and that also satisfies most or all of the above criteria is challenging and has not been achieved so far. For instance, many feedstocks described in the prior art are not spoolable and/or are not de-spoolable at room temperature. This makes a proper handling by end customers more difficult or prevents a smooth automatic printing process without the need for manual feedstock feeding operations. Such feedstocks can hence not be sold to end customers using commercially available FFF equipment, such as the FlashForge Dreamer™ 3D printer. Further, many currently developed feedstocks have a low loading of sinterable particles and thus suffer severe shrinkage (and possibly also distortion) during the subsequent debinding and sintering steps.

The present invention has been made to solve some or all of the above problems.

In a first aspect, the present invention aims at providing a feedstock suitable for an additive manufacturing process allowing to obtain objects made from metal, alloys, ceramics, composites (e.g. cermet) or glass. The feedstock preferably can be spooled on spools with small diameter, such as 2-20 cm, preferably 3-10 cm, and hence can be sold and shipped to consumers that use commercially available FFF equipment.

In this and a related aspect, the present invention aims at providing a feedstock for an additive manufacturing method that allows obtaining a green body having sufficient green strength, cohesiveness and structural integrity. This is an important aspect, as consumers may need to send the green body to a service provider for debinding and sintering at higher temperatures if suitable equipment is not available.

In yet another aspect, the present invention aims at providing a feedstock suitable for an additive manufacturing process has a high loading of sinterable particles and that is able to produce a final sintered product having a low rate of shrinkage as compared to the green body.

In one aspect, the present invention further aims at providing a sintered body wherein the structural parts have high strength and/or a density that preferably reaches 65% or more of the density of the bulk material forming the sinterable particles present in the feedstock.

The present invention further aims at providing a new feedstock suitable for an additive manufacturing method that allows obtaining final parts that are made to 95% or more, preferably 99% or more, from a metal, metal alloy, metal oxide, glass ceramic or mixture thereof.

The present invention thus provides the following:

1. Feedstock, comprising
   (P) sinterable particles made of a metal, metal alloy, glass, ceramic material, or a mixture thereof; and
   (B) a binder composition comprising
   (b1) 5-15% by weight, relative to the total weight of the binder composition, of a polymeric compatibilizer, and
   (b2) 85-95% by weight, relative to the total weight of the binder composition, of a polymeric binder component, the polymeric binder component being selected from the group consisting of
   (b2-1) a polymer mixture or polymer alloy, the mixture or alloy comprising at least a first and a second polymer, the Tg of the first polymer being −20° C. or lower and the Tg of the second polymer being 60° C. or higher;
   (b2-2) one, two or more block copolymers, comprising at least a first polymer block and second polymer block, the first polymer block having a Tg in the range of −20° C. or lower and the second polymer block having a Tg of 60° C. or higher; and
   (b2-3) mixtures of (b2-1) and (b2-2);
   wherein the amount of sinterable particles (P) is 40 Vol.-% or more of the composition.

2. Feedstock according to item 1, wherein the first polymer and the second polymer in (b2-1) are both selected from (b2-1-1) homopolymers obtained from a (meth)acrylate or (meth)acrylic acid, are both selected from (b2-1-2) random copolymers obtained from two or more monomers selected from (meth)acrylic acid and (meth)acrylates, or form a mixture of such homopolymers and copolymers, and/or
   wherein each of the one, two or more block copolymers (b2-2) is a block copolymer wherein all polymer blocks are obtained from monomers selected from the group consisting of (meth)acrylic acid and (meth)acrylates.

3. The feedstock according to item 1 or 2, wherein the one, two or more block copolymers (b2-2) are selected from diblock copolymers and triblock copolymers.

4. Feedstock according to item 3, wherein each of the one, two or more block copolymers (b2-2) is a triblock copolymer of the structure B-A-B, wherein the polymer block A is the first polymer block having a Tg of −20° C. or lower and the polymer block B is the second polymer block having a Tg of 60° C. or higher.

5. Feedstock according to any one of items 1 to 4, wherein said first polymer or said first polymer block having a Tg in the range of −20° C. or lower is obtained from n-butyl acrylate, and said second polymer or said second polymer block having a Tg of 60° C. or higher is obtained from methyl methacrylate.

6. Feedstock according to any one of items 1 to 5, wherein in (b2-1) the content of said first polymer having a Tg of −20° C. or lower is in the range from 65 to 95% by weight, preferably 70-90% by weight, and the content of the second polymer having a Tg of 60° C. or higher is in the range of 5 to 35% by weight, preferably 10 to 25% by weight, based on the total weight of the polymers forming the component (b2-1); or wherein in each of the one, two or more block copolymers (b2-2), the content of the first polymer block having a Tg of −20° C. or lower is in the range of 65-95% by weight, preferably 70-90% by weight, and the content of the second polymer block having a Tg in the range of 60° C. or higher is in the range of 5 to 35% by weight, preferably 10 to 25% by weight, based on the total weight of the block copolymer; or wherein two or more block copolymers (b2-2) are used, and the content of the first polymer block having a Tg of −20° C. or lower is in the range of 65-95% by weight, preferably 70-90% by weight, and the content of the second polymer block having a Tg in the range of 60° C. or higher is in the range of 5 to 35% by weight, preferably 10 to 25% by weight, based on the total weight of all block copolymers.

7. Feedstock according to any one of items 1 to 6, wherein the polymeric binder component consists of (b2-2) one or two block copolymers, each of the one or two block copolymers having a structure B-A-B, wherein A is the first polymer block having a Tg of −20° C. or lower and is obtained from n-butyl acrylate and B is the second polymer block having a Tg in the range of 60° C. or higher and is obtained from methyl methacrylate, and wherein in each of the one or two block copolymers the content of the first polymer block is in the range of 65-95% by weight, preferably 10-70% by weight, and the content of the second polymer block is in the range of 5-35% by weight, preferably in the range of 10-30% by weight, based on the total weight of each block copolymer.

8. Feedstock according to any one of items 1 to 7, wherein the polymeric compatibilizer (b-1) is a polymer having in a side chain or the main chain of the polymer one or more groups selected from a hydroxyl group, an ether group, an oxo group, an ester group, a carboxylic acid group, a carboxylic acid anhydride group, a thiol group, an primary, secondary or tertiary amine group, and an amide group, and is preferably a polymer having one or more groups selected from a hydroxyl group, a carboxylic acid group, and a carboxylic acid anhydride group.

9. Feedstock according to item 8, wherein the polymeric compatibilizer (b-1) is a polymer having in a side chain one or more groups selected from a hydroxyl group, a carboxylic acid group, and a carboxylic acid anhydride group.

10. Feedstock according to any one of items 1 to 9, wherein the polymeric compatibilizer (b-1) is a carboxylic acid or carboxylic acid anhydride modified polyolefin, preferably a carboxylic acid or carboxylic acid anhydride modified polyethylene or a carboxylic acid or carboxylic acid anhydride modified polypropylene.

11. Feedstock according to any one of item 10, wherein the binder composition (B) consists of (b-1) a carboxylic acid or carboxylic acid anhydride modified polyethylene or a carboxylic acid or carboxylic acid anhydride modified polypropylene as polymeric compatibilizer (b-1) and one, two or more block copolymers (b-2-2) as binder component.

12. Feedstock according to any one of items 1 to 11, which is in the form of a filament or pellet, preferably a filament.

13. Feedstock according to any one of items 1 to 12, wherein the particles (P) are selected from the group consisting of a metal or metal alloy, preferably stainless steel, and ceramic materials, preferably alumina and titania.

14. Feedstock according to any one of items 1 to 13, wherein 95% by weight or more, preferably 99% by weight or more, more preferably 100% by weight of the particles (P) have a diameter of 100 μm or less, preferably 75 μm or less, more preferably 50 μm or less.

15. Use of the feedstock according to any one of items 1 to 14 in an additive manufacturing method, preferably in a Fused Filament Fabrication Method.

16. An additive manufacturing method, which is preferably a Fused Filament Fabrication method, the additive manufacturing method comprising the steps:
A. Forming a first layer of a feedstock as defined in any one of items 1 to 14 on a support;
B. Forming at least one further layer on top of the first layer to form a green body;
C. Performing a debinding treatment in order to form a brown body from the green body obtained in step B; and
D. Simultaneously or subsequently to step C, performing a sintering treatment to sinter the sinterable particles (P).

17. Process according to item 16, wherein the debinding treatment in step (C) comprises a heating treatment that is performed for 2 hours or more, preferably 4 hours or more, according to a temperature profile that comprises one or more temperature increasing segments and optionally at least one temperature holding segment defining an end temperature, the highest temperature of the heating treatment being in the range of 300-450° C., wherein the average heating rate between 200° C. and the highest temperature is 5° C./minute or less, preferably 1° C. or less, still further preferably 0.5° C. or less, and most preferably 0.1° C. or less.

18. Process according to any one of items 16 or 17, wherein the debinding step (C) and/or the sintering step (D) are performed in vacuum, an inert atmosphere, a reducing atmosphere or air.

19. Article, obtainable by the process according to any one of items 16 to 18.

20. Article according to item 19, which has density in the range of 65% or more, preferably 70% or more, of the bulk density of the material forming the sinterable particles (P).

21. Article according to any one of items 19 and 20, which is made of stainless steel and has a density of 5.5 g/cm3 or more, preferably 6.0 g/cm3 or more.

Further features and advantages of the present invention will become apparent in view of the following detailed description.

Definitions

The following terms will be used in the following detailed description:

The term "polymer" and "polymeric compound" are used synonymously. A polymer or polymeric compound is generally characterized by comprising 5 or more, typically 10 or more repeating units derived from the same monomeric compound/monomer. A polymer or polymeric material generally has a molecular weight of at least 300, typically 1000 or greater. The polymer may be a homopolymer, a random copolymer or a block copolymer, unless reference is made to specific forms thereof. The polymer may be synthesized by any method known in the art, including radical polymerization, cationic polymerization and anionic polymerization.

A monomer in the sense of the present invention is typically a molecule of a chemical species that is capable to react with another molecule of the same chemical species to form a dimer, which then is able to react with a another molecule of the same chemical species to form a trimer, etc., to ultimately form a chain wherein 5 or more, preferably 10 or more repeating units derived from the same chemical species are connected to form a polymer. The group of the monomer molecule capable of reacting with a group of another monomer molecule to form the polymer chain is not particular limited, and examples include an ethylenically unsaturated group, an epoxy group, etc. The monomer may be monofunctional, bifunctional, trifunctional or of higher functionality. Examples of bifunctional monomers include di(meth)acrylates and compounds possessing both a carboxylic acid group and an amide group, and examples of trifunctional monomers include tri(meth)acrylates.

The term "(meth)acrylic acid" is used to jointly denote methacrylic acid and acrylic acid, and the term "(meth) acrylate" is used to jointly denote esters of methacrylic acid and acrylic acid, such as methyl methacrylate or butyl acrylate. The ester residue is preferably a hydrocarbon group having 1 to 20 carbon atoms, which may or may not have further 1, 2, 3 or more substituents. The substituents are not particularly limited and may be selected from a hydroxyl group, a cyano group, an amino group, an alkoxy group, a alkyleneoxy group, etc. The ester group of the (meth) acrylate is preferably a non-substituted straight or branched alkyl group having 1 to 20, preferably 1 to 12 carbon atoms, or is a straight or branched alkyl group having 1 to 20, preferably 1 to 12 carbon atoms that is substituted with one or two hydroxyl groups.

The term "Tg" denotes the glass transition temperature, measured by Differential Scanning Calorimetry according to ASTM D7426-08(2013).

In the present invention, all physical parameters are measured at room temperature and at atmospheric pressure ($10^5$ Pa), unless indicated differently.

The term "sinterable" is used to denote inorganic materials that have a melting point of 450° C. or higher, preferably 500° C. or higher, more preferably 600° C. or higher.

Sinterable materials in this sense include metals, alloys, ceramics, and glasses having the required melting point. For composites (such as cermet), it would be sufficient if at least some of the material present on the outside of the particle has a melting temperature in the above range, so that the particles may bind to each other during the sintering treatment to form the final sintered body.

As used herein, the indefinite article "a" indicates one as well as more than one and does not necessarily limit its reference noun to the singular.

The term "about" means that the amount or value in question may be the specific value designated or some other value in its neighborhood, generally within a range of ±5% of the indicated value. As such, for instance the phrase "about 100" denotes a range of 100±5.

The term and/or means that either all or only one of the elements indicated is present. For instance, "a and/or b" denotes "only a", or "only b", or "a and b together". In the case of "only a" the term also covers the possibility that b is absent, i.e. "only a, but not b".

The term "comprising" as used herein is intended to be non-exclusive and open-ended. A composition comprising certain components thus may comprise other components besides the ones listed. However, the term also includes the more restrictive meanings "consisting of" and "consisting essentially of". The term "consisting essentially of" allows for the presence of up to and including 10 weight %, preferably up to and including 5% of materials other than those listed for the respective composition, which other materials may also be completely absent.

The term "feedstock" is used to denote a material that can be used for forming a green body in an additive manufacturing process. The feedstock may have any form or shape, but is preferably in the form of a filament or pellet, preferably a filament. The term "filament" denotes a material having a circular, oval, or angular shape when viewed in a cross-section in a direction perpendicular to its longest axis, and wherein the diameter of this circular shape or the longest axis of the oval or angular shape is, by a factor of 10 or more, smaller than the longest axis of the material ([longest axis]/[diameter or longest axis in cross-section perpendicular to longest axis]≥10). The term "pellet" denotes a particle having a circular, oval, or angular shape when viewed in a cross section in a direction perpendicular to its longest axis, and wherein the diameter of the circular shape or the longest axis of the oval or angular shape is, by a factor of less than 10, preferably 5 or less, more preferably 3 or less, further preferably 2 or less, smaller than the longest axis of material ([longest axis]/[diameter or longest axis in cross-section perpendicular to longest axis]<10). The pellet may also be of spherical shape.

DESCRIPTION OF THE DRAWINGS

FIG. 3a shows the IR-ATR analysis of Fusabond, stainless steel particles (17-4 PH) and a mix between them. The circle indicates a newly appearing peak in the mix of the Fusabond and the stainless steel particles.

Biopolymer 2500HP). FIG. 3b shows that the IR spectrum of Filament is basically identical to that of pure PLA.

DETAILED DESCRIPTION

Figure 1:
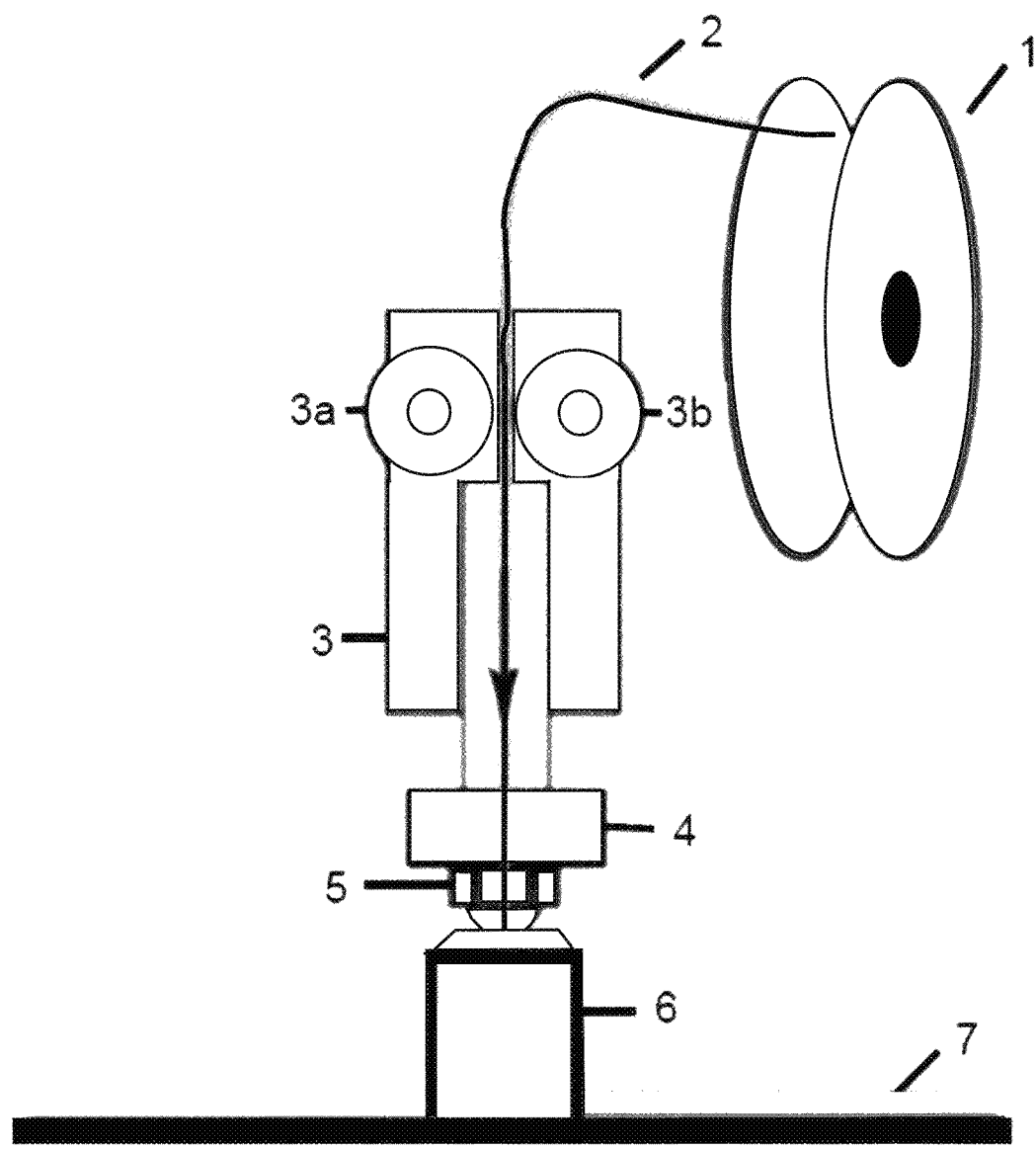
FIG. 1 is a schematic view of the fused filament fabrication process. Herein a filament (2) is obtained from a spool (1) and fed to a feeding apparatus (3). The feeding apparatus (3) is equipped with rollers (3a, 3b), which counter-currently forward the filament (2) to a heating element (4). The heating element (4) heats the filament to the applicable temperature (e.g. 250° C.), and the softened filament is then forwarded to a printhead nozzle (5). The printhead nozzle (5) deposits the soften filament on a support (6) that is present on a base (7). The position of the printhead (5) is changed by either moving the printhead or the base plate in x/y/z position, so that the material can be deposited in accordance with printer instructions.

In the following, the feedstock for an additive manufacturing process of the present invention and the components therein are described in more detail:

Sinterable Particles (P)

The feedstock of the present invention contains sinterable particles (P) that, after the removal of the binder composition (debinding) from the feedstock and sintering treatment to fuse the particles, form the final 3-dimensional object.

The sinterable particles are made of a metal, metal alloy, glass, ceramic material or a mixture thereof. Herein, "made of" describes that the particles consist of the metal, metal alloy, glass, ceramic material, or a mixture of these components. Unavoidable impurities may however be present. As such, 95% by weight or more of the sinterable particles consist of a metal, metal alloy, glass, ceramic material, or a mixture thereof, with the remainder being unavoidable impurities. Preferably, at least 98% by weight or more, and more preferable at least 99% by weight or more of the sinterable particles is formed by the metal, metal alloy, glass, ceramic material or a mixture thereof.

The metal that may be comprised in the sinterable particles is not particularly limited, and generally any desirable metal can be used as long as it has the required melting point. Examples thereof include aluminum, titanium, chromium, vanadium, cobalt, iron, copper, nickel, cobalt, tin, bismuth, molybdenum and zinc as well as tungsten, osmium, iridium, platinum, rhenium, gold and silver. Preferred are metal particles of aluminum, iron, copper, nickel, zinc, gold and silver. Since titanium has the general tendency to oxidize or form other chemical species (e.g. nitrides) during the subsequent debinding and sintering steps unless specific steps for avoiding such a reaction are taken (e.g. low debinding or sintering temperature), in one embodiment the sinterable particles are not made from titanium or a titanium alloy.

The metal alloy also is not further limited, and generally all kinds of metal alloys can be used as long as they have the required melting point, so that do not melt at the debinding temperature, but fuse at the sintering temperature employed during the manufacturing process. Preferred alloys are those formed by aluminum, vanadium, chromium, nickel, molybdenum, titanium, iron, copper, gold and silver as well as all kinds of steel. In the steel, the amount of carbon is generally between 0 and 2.06% by weight, between 0 to 20% of chromium, between 0 and 15% of nickel, and optionally up to 5% of molybdenum. The sinterable particles are preferably selected from metals, stainless steel and ceramics, with stainless steel being particularly preferred.

The glass of which the sinterable particles may be formed is not limited, and all types of glass can be used provided that the glass particles fuse at their boundaries at the sintering temperature employed in the process.

The ceramic material also is not limited, as long as its temperature properties allow fusion of the particles at the sintering temperature. Typically, the ceramic materials include alumina, titania, zirconia, metal carbides, metal borides, metal nitrides, metal silicides, metal oxides and ceramic materials formed from clay or clay type sources. Other examples include barium titanate, boron nitride, lead zirconate or lead titanate, silicate aluminum oxynitride, silica carbide, silica nitride, magnesium silicate and titanium carbide.

The mixtures of the sinterable particle include mixtures of different metals and/or different alloys, but also include mixtures of more different tyes of materials. An example is a mixture of a metal or metal alloy and a ceramic material, such as a cermet material. For instance, a cermet made of tungsten carbide and cobalt, as used in cutting tools, is also encompassed by the sinterable particles.

The metal or metal alloy forming the sinterable particles may be magnetic or non-magnetic.

The sinterable particles may be of any shape, but non-spherical particles are preferable. This is due to the fact that non-spherical particles provide interlocking regions during the subsequent debinding and sintering steps, which in turn facilitates maintaining a stable form during the debinding and sintering steps.

The particle size of the sinterable particles is not particular limited, but is preferably 100 µm or less, more preferably 75 µm or less, most preferably 50 µm or less. Herein, the particle size relates to the equivalent spherical diameter determined by a laser light scattering technique, measured e.g. with laser emitting at 690 nm, for instance according to ASTM 4464-15, expressed as X50 (50% of the particles have a size of less than the expressed value). An apparatus for determining the particle size that can be used in accordance with the present invention is a SALD-3101 Laser Diffraction Particle Size Analyzer with standard sampler and flow cell SALD-MS30, available from Shimadzu Corporation. Preferably, most (90% or more) and more preferably all (100%) of the particles have an equivalent spherical diameter equal to or smaller than 100 µm or less, more preferably 50 µm or less. Such particles can be obtained by a suitable operation for removing too large particles, e.g. by sieving. The lower limit is not particularly limited, but is preferably 0.1 µm or more, more preferably 1 µm or more. Feedstocks wherein the sinterable particles have a small particle diameter, such as 50 µm or less, can generally be processed with all kinds of print heads, whereas large sinterable particles having a size of greater than 100 µm might be less suitable for print heads requiring fine filaments of feedstock, as then clogging or blocking problems might occur.

Binder Composition (B)

The binder composition comprises (b1) 5 to 15% by weight, relative to the total weight of the binder composition, of a polymeric compatibilizer, and (b2) 85 to 95% by weight, relative to the total weight of the binder composition, of a polymeric binder component. The binder composition hence comprises at least two distinct components.

The binder composition may consist of the components (b1) and (b2), so that the components (b1) and (b2) form 100% of the binder composition, yet may also comprise other components in an amount of up to 10% by weight, so that the components (b1) and (b2) form 90% by mass or more of the binder composition, relative to the total weight of the binder composition. Preferably the binder composition consists of the components (b1) and (b2). This is different from e.g. the binder employed in the commercial product Filamet™, which consists of only polylactic acid (see FIG. 3b). Polylactic acid has a Tg of 55° C. (see FIG. 7b).

Polymeric Compatibilizer (b1) The polymeric compatibilizer (b1) is a component that is distinct from the polymers forming the polymer mixture or polymer alloy (b2-1), and is also not a block copolymer in accordance with component (b2-2). This is due to the fact that the polymeric compatiblizer is a polymer that is functionalized with functional groups capable of interacting with the surface of the sinterable particles, whereas the polymers in the polymer mixture (b2-1) are typically non-modified by such functional groups. Incidentally, a carboxylic acid group present in the main chain or side chain of a (meth)acrylic polymer is not a functional group capable of interacting with the surface of the sinterable particles in the sense of the present invention.

The polymeric compatibilizer is a thermoplastic polymer that is modified, in particular graft-modified, with a compound having functional groups capable of interacting with the surface of the sinterable particles. Such groups are preferably selected from a hydroxyl group, an ether group, an oxo group, and ester group, a carboxylic acid group other than a carboxylic acid group of a (meth)acrylate, a carboxylic acid anhydride group, a thiol group, a primary, secondary or tertiary amine group, an amide group and a silane group. Further preferably, the polymeric compatibilizer is a polymer that is obtainable by modifying a thermoplastic polymer selected from olefin homopolymers and copolymers (in particular homopolymers and copolymers of ethylene, propylene, and mixtures and alloys thereof), but the thermoplastic polymer can also be a condensation homopolymer or copolymer, such as polyamide, polyester or polyurethane, specifically polyethylene terephthalate, polybutylene terephthalate, polyethylene naphthalate, polylactic acid, polybutylene napthalate, etc. Furthermore, the polymeric compatibilizer may be a modified phenylene oxide polymer or copolymer, a modified styrenic polymer or copolymer, and modified other general engineering polymers well known to the skilled person. Preferably, the polymeric compatibilizer is a modified polyolefin, such as modified polyethylene, modified polypropylene or modified ethylene/propylene copolymers.

Herein, "modified" denotes that the polymeric compatibilizer is obtainable by reacting the thermoplastic polymer with a reagent in order to introduce one or more groups capable of interacting with the surface of the sinterable particles into the polymer main chain and/or side chain. The modification may be achieved by introducing a group comprising a hydroxyl group, an ether group, an oxo group, an ester group (preferably not including an ester group of a (meth)acrylate), a carboxylic acid group other than a carboxylic acid group of (meth)acrylic acid, a carboxylic acid anhydride group, a thiol group, a primary, secondary or tertiary amine group, an amide group and a silane group into the main chain and/or the side chain of the polymer. Particularly preferable is a modification of a polyolefin (polyethylene or polypropylene) by a carboxylic acid anhydride, such as obtained by the grafting of maleic anhydride to polypropylene.

The methods for effecting such a modification are well-known to a skilled person, and for instance the grafting of maleic anhydride on polyethylene/polypropylene blends is described in Polymer Testing, Volume 22, Issue 2, April 2003, pages 191 to 195. Furthermore, such polymers are commercially available, e.g. in the Fusabond® P and E series of DuPont™.

Figure 7A:
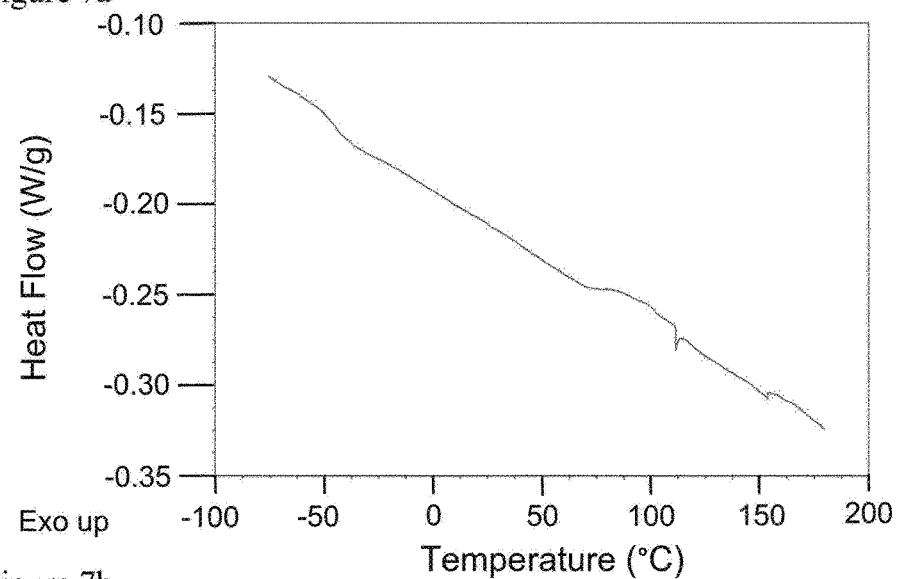
FIG. 7a shows the DSC curve of Kurarity LA 4285, a methyl methacrylate/n-butyl block copolymer of the structure B-A-B (with B being methyl methacrylate blocks, and A being n-butyl blocks). The DSC curve shows a Tg around −50° C., caused by the n-butyl polymer block, and shows further thermal processes in the temperature range of 80 to 120° C. It is assumed that there is also a Tg at around 110° C. caused by the methyl methacrylate polymer blocks.
Figure 7B:
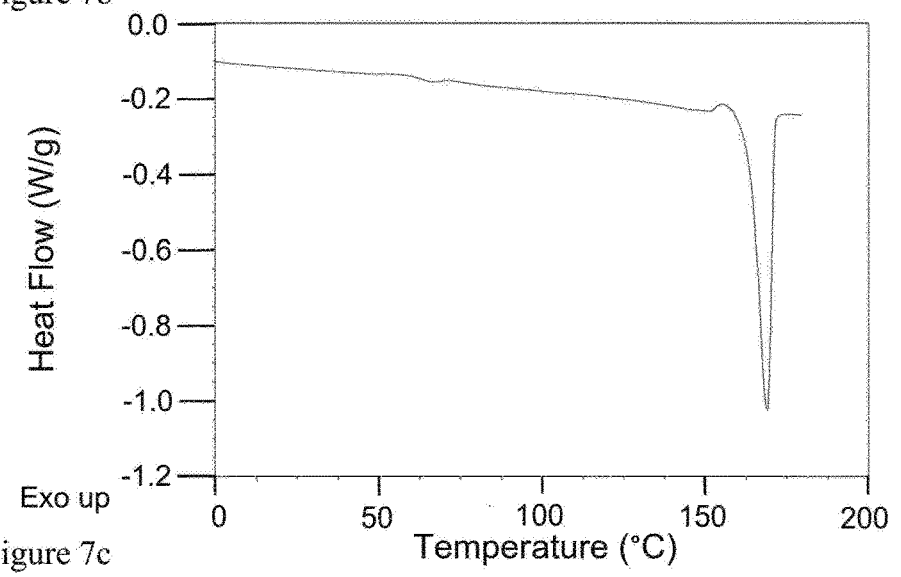
FIG. 7b shows the DSC of commercial polylactic acid, indicating a Tg at around 55° C. The DSC further shows a melting point at around 165° C.
Figure 7C:
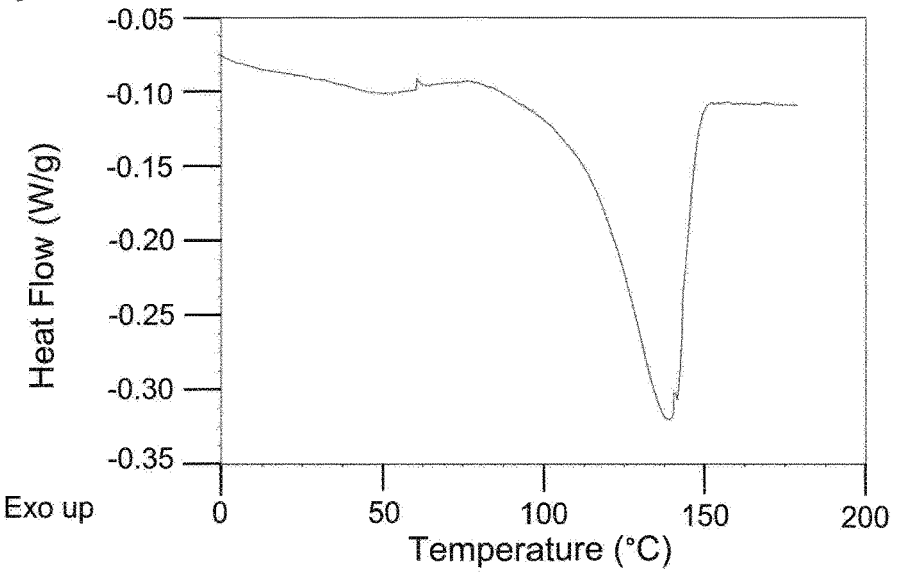
FIG. 7c shows the DSC of Fusabond™ P353 (polymeric compatibilizer). The DSC shows no pronounced glass transition temperature Tg, and confirms the melting point indicated by the manufacturer (135° C.).

The polymeric compatibilizer is generally a thermoplastic material having both a melting point (determined according to ASTM D3418) and a Vicat Softening Point (determined according to ASTM D1525) in the range of 20° C. or higher to 300° C. or less, more preferably 50° C. or higher to 250° or less, further preferably 80° C. or higher to 200° C. or less. This ensures that the polymeric compatibilizer softens or melts at temperatures used for processing the feedstock (e.g. at the time of mixing, spooling, extrusion during filament production, or filament printing). These requirements can also be met by suitable choosing commercial products. FIG. 7c shows the DSC graph of Fusabond P353, having a melting point of 135° C.

Preferably, the polymeric compatibilizer is not a (meth)acrylic polymer. Incidentally, in the present invention, the term "(meth)acrylic polymer" is used to denote polymers having repeating units obtained from acrylic acid or methacrylic acid, or esters thereof (also referred to as (meth)acrylates), in an amount of 50 mol % or more, preferably 80% or more, more preferably 100 mol %, of all repeating units.

Polymeric Binder Component (b2)

The binder composition comprised in the feedstock of the present invention comprises 85 to 95% by weight, relative to the total weight of the binder composition, of a polymeric binder component (b2). The polymeric binder component is selected from the group consisting of (b2-1) a polymer mixture or a polymer alloy, the mixture or alloy comprising at least a first and a second polymer, the Tg of the first polymer being −20° C. or lower and the Tg of the second polymer being 60° C. or higher; (b2-2) one, two or more block copolymers, comprising at least a first polymer block and second polymer block, the first polymer block having a Tg in the range of −20° C. or lower and the second polymer block having a Tg of 60° C. or higher; and (b2-3) mixtures of (b2-1) and (b2-2). The polymeric binder component (b2) consists of the component (b2-1), consists of the component (b2-2), or consists of the mixture (b2-3) of the components (b2-1) and (b2-2).

The present inventors have found that by using such a mixture, alloy or block copolymer, the required balance of properties necessary for a successful feedstock for an additive manufacturing process, in particular for a fused filament fabrication method, can be met. Without wishing to be bound by theory, it is believed that the Tg of the first polymer of the first polymer block being −20° C. or lower allows imparting sufficient flexibility for providing a spoolable filament and a robust green part, and that the second polymer or second polymer block having a Tg of 60° C. or higher allows imparting sufficient rigidity to the feedstock such as to provide a green body having sufficient green strength and to maintain the physical integrity of the green body.

In the present invention, a "polymer block having a Tg" refers to the Tg of the corresponding homopolymer, such as a homopolymer having e.g. a molecular weight of 250,000 and a polydispersity of 2. That is, when reference is made to "a first polymer block having a Tg in the range of −20° C. or lower", it is meant that a homopolymer of the monomer forming the first polymer block has a Tg of −20° C. or lower.

The same also applies to the second polymer block having a Tg of 60° C. or higher. The Tg of such homopolymers can be identified by reference to published values. Incidentally, in actual DSC graph of a block copolymer, a DSC event that corresponds to the Tg of a polymer block may occur at slightly different temperatures as compared to the Tg of the corresponding homopolymer. An example of this is shown in FIG. 7a, showing the DSC of a methyl methacrylate/n-butyl acrylate block copolymer Kurarity LA 4285 of the structure B-A-B (with B being the methyl methacrylate blocks and A being the n-butyl acrylate block), wherein the DSC event attributable to a Tg of the n-butyl block occurs at around−45° C., whereas the Tg of n-butyl acrylate is −54° C.

Monomers that are able to provide homopolymers having a Tg of −20° C. or lower are well-established in the art and examples include acetaldehyde, allyl glycidyl ether, trans-Butadiene, 1-Butene, n-butyl acrylate, sec-Butyl acrylate, butyl glydydyl ether, butyl vinyl ether, ε-Caprolactone, cis-Chlorobutadiene, dodecyl methacrylate, dodecyl vinyl ether, epichlororhydrin, 1,2-Epoxybutane, 1,2-Epoxydecane, 1,2-Epoxyoctane, 2-Ethoxyethyl acrylate, ethyl acrylate, polyethylene (HDPE), ethylene adipate, ethylene malonate, ethylene oxide, 2-Ethylhexyl acrylate, 2-Ethylhexyl methacrylate, ethyl vinyl ether, formaldehyde, isobutyl acrylate, isobutylene, cis-Isoprene, trans-Isoprene, methyl glycidyl ether, methylphenylsiloxane, methyl vinyl ether, octadeycl methacrylate, 1-Octene, octyl methacrylate, propylene oxide, propyl vinyl ether, tetramethylene adipate, trimethylene oxide, and vinylidene fluoride.

In view of the need to debind the polymers after formation of the green body/during the formation of the brown body, (meth)acrylate polymers and polymer blocks are however preferred. In this regard, the Tg of the acrylate is generally lower than that of the methacrylate, and there is a general tendency that the Tg lowers with increasing number of carbon atoms in the ester residue of the corresponding acrylate or methacrylate. As such, preferred monomers from which the polymers or copolymers in the polymer mixture (b2-1) having a Tg of −20° C. or lower are derived, or monomers that are able to provide a copolymer block having a Tg of −20° C. or lower, include n-propyl acrylate, n-butyl acrylate, sec-butyl acrylate, pentyl acrylate, hexyl acrylate, heptyl acrylate, octyl acrylate, nonyl acrylate, decyl acrylate, undecyl acrylate and dodecyl acrylate, as well as 2-ethylhexyl acrylate. N-butyl acrylate is particularly preferred.

It has been found that particularly good results and performance properties can be obtained if the content of the polymer having a Tg of −20° C. or lower in the mixture or alloy (b2-1) is in the range of 65-95% by weight, preferably 70-90% by weight, relative to the total of the polymer mixture or alloy (b2-1), and also if the content of the first polymer block having a Tg of −20° C. or lower is in the range of 65%-95% by weight, preferably 70-90% by weight, of the total weight of the block copolymer. This relatively high amount of the rubber-like polymer or polymer block having a low Tg of −20° C. or less avoids that the feedstock is too brittle at a room temperature in order to be processed e.g. by spooling and de-spooling, and still allows for sufficient amount of the "hard" component having a Tg of 60° C. or higher to provide rigidity and strength to the green part.

The polymeric binder component furthermore contains a second polymer having a Tg of 60%° C. or higher in the polymer mixture or alloy (b2-1), or contains a second polymer block having a Tg of 60° C. or higher in the block copolymer (b2-2).

Examples of monomers able to provide the second polymer or second polymer block include many monomers known to the skilled person, including in particular (meth) acrylates and salts of the corresponding acrylates, e.g. potassium acrylate. Specific examples include acrylic acid, benzyl methacrylate, bisphenol A terephthalate, bisphenol carbonate, bisphenol F carbonate, bisphenol Z carbonate, cis-Butadiene, N-tert-Butylacrylamide, 2-tert-Butylaminoethyl methacrylate, tert-Butyl vinyl ether, cyclohexyl methacrylate, cyclohexyl vinyl ether, N,N-Dimethylacrylamide, 2,6-Dimethyl-1,4-phenylene oxide, dimethylstyrene, hexyl acrylate, 2-Hydroxyethyl methacrylate, methacrylic acid, methacrylic anhydride, methacrylonitrile, 4-Methoxystyrene, methyl methacrylate, methylstyrene, phenyl methacrylate, styrene, trimethylstyrene, vinyl alcohol, vinyl 4-tert-butylbenzoate, vinyl butyral, vinyl carbazole, vinyl cyclohexanoate, vinyl formal, vinyl pivalate, 2-Vinylpyridine, 4-Vinylpyridine. Of these, the respective acrylates and methacrylates are preferred, with methyl methacrylate being particularly preferred.

Further, preferably all elements contained in the mixture of alloy (b2-1) and the block copolymer (b2-2) are made up exclusively from carbon, hydrogen and optionally nitrogen and oxygen in order to allow a thermal depolymerization without the formation of residues or toxic gases.

The polymeric binder component (b2) preferably consists of the one, two or more block copolymers (b2-2) Further preferably, all of the polymer blocks are derived from (meth)acrylates, and particularly preferably all first polymer blocks are derived from n-butyl acrylate and all second polymer blocks are derived from methyl methacrylate.

The polymer mixture of polymer alloy (b2-1) may consist of the first and second polymer only, or may contain an additional polymer. The Tg of the additional polymer is not particularly limited. However, preferably the polymer mixture of polymer alloy (b2-1) consists of or consists essentially of the first and second polymer, or comprises a third or further polymer in an amount of 20% by weight or less, or preferably 10% by weight or less, of the total polymers forming the polymer mixture of polymer alloy (b2-1).

Similarly, the one, two or more block copolymer(s) (b2-2) can consist of the first and second polymer block, or may comprise additional polymer blocks. Herein, the embodiment wherein the one, two or more block copolymers consists of the first and second polymer block includes the possibility of several polymer blocks of the first and second polymer blocks being present, such as in the case of a block copolymer having the structure B-A-B, wherein the polymer block A is the first polymer block and the polymer block B is the second polymer block.

It has been found that such a block copolymer of the general structure B-A-B, wherein a "soft" first polymer block A having the Tg of −20° C. or lower is capped with "hard" polymer blocks B having a Tg of 60° C. or higher, provides particularly good properties. Herein, preferably all of the polymer blocks are (meth)acrylate polymer blocks, and further preferably the first polymer block A is derived from n-butyl acrylate and the second polymer block B is derived from methyl methacrylate. Such polymers can easily be prepared by the skilled person, and additional information on the formation of such block copolymers can be found in U.S. Pat. Nos. 6,329,480 and 6,555,637. Such copolymers are also commercially available within the KURARITY™ series of block copolymers, available from Kuraray Co., Ltd.

Alternatively, the one or more block copolymer may have structures selected from B-A-B', B-A-A'-B, B-A-A'-B', B-A-B-A-B, B-A-B-A'-B, B-A-B'-A-B, etc., wherein A represents first polymer block having a Tg of −20° C. or lower, B represents a second polymer block having a Tg of 60° C. or higher, A' represents a first polymer block having a Tg of −20° C. or lower derived from a different monomer than the polymer block A, and B' represents a second polymer block having a Tg of 60° C. or higher derived from a different monomer than the polymer block B. Also in these embodiment, preferably all of the polymer blocks A, A', B, and B' are derived from (meth)acrylic acid and (meth)acrylates, more preferably (meth)acrylates.

The weight average and number average molecular weight of the polymers forming the polymer mixture of polymer alloy (b2-1) or of the 1, 2 or more block copolymers (b2-2) is not particularly limited, and typically the weight average molecular weight is in the range of 1,000 to 10,000,000 preferably 10.000 to 1,000,000. Furthermore, the polydispersity (Mw/Mn) is not particularly limited, and is generally in the range of 1 to 10, preferably 1 to 5, more preferably 1 to 4.

As outlined above, the polymeric binder component (b2) is selected from the polymer mixture or alloy (b2-1), the one or more block copolymers (b2-2), or the mixture thereof (b2-3), each containing a first polymer or polymer block having a Tg of −20 C or lower and a second polymer or polymer block having a Tg of 60° C. or higher.

The Tg of the first polymer or polymer block can be −20 C or lower, and its lower limit is not particular limited. Preferably, the first polymer or polymer block has a Tg of −25° C. or lower, further preferably −30° C. or lower, most preferably −40° C. or lower.

The Tg of the second polymer or polymer block is 60° C. or higher, preferably 70° C. or higher, more preferably 80° C. or higher, further preferably 90° C. or higher. The upper limit of the second polymer or polymer block is not particularly limited, but is preferably below the temperature used during the formation of the green part (e.g. in the print head) of the additive manufacturing process, in order to allow the second polymer or polymer block to change into a rubbery and more flexible state during the green part formation, which facilitates the manufacturing process and extrusion of the feedstock. If it is desired to provide the feedstock in filament form on a spool, the filament extrusion and spooling operation are preferably performed at a temperature higher than the Tg of the second polymer or polymer block. For practical purposes, the Tg of the second polymer or polymer block is thus preferably 200° C. or less, more preferably 180° C. or less, further preferably 160° C. or less, and most preferably 140° C. or less.

The binder composition may consist of the polymeric compatibilizer (b1) and the polymeric binder component (b2). Further, the polymeric binder component (b2) may consist of the polymer mixture of polymer alloy (b2-1), may consist of the one, two or more block copolymers (b2-2), or may consist of a mixture (b2-3) of the polymer mixture of polymer alloy (b2-1) and the 1, 2 or more block copolymers (b2-2). Preferably, the binder composition consists of the polymeric compatibilizer (b1) and the polymeric binder component (b2), wherein the polymeric binder component (b2) consists of one, two or more block copolymers (b2-2). Preferably, in this embodiment, the one, two or more block copolymers (b2-2) are formed by one or two block copolymers. As an example, the component (b2-2) may consist of two block copolymers, each of the block copolymers comprising a first polymer block derived from n-Butyl acrylate and a second polymer block derived from methyl methacrylate, wherein the relative amount of the first polymer block (derived from n-Butyl acrylate) and the second polymer block (derived from methyl methacrylate) differs between the two block copolymers. In another example, the component (b2-2) may consist of one block copolymer wherein the first polymer block is derived from n-butyl acrylate and the second polymer block is derived from n-butyl acrylate.

When the component (b2-2) comprises or consists of only one block copolymer, the content of the first polymer block is preferably 65-95% by weight, more preferably 70-90% by weight, and the content of the second polymer block is preferably in the range of 5-35% by weight, more preferably 10 to 30% by weight, based on the weight of the block copolymer. When the component (b2-2) comprises or consists of two or more block copolymers, the content of the first polymer block is preferably 65-95% by weight, more preferably 70-90% by weight, and the content of the second polymer block is preferably in the range of 5-35% by weight, more preferably 10 to 30% by weight, based on the weight of the respective block copolymer, for each of the block copolymers. Further preferably, when the component (b2-2) comprises or consists of two or more block copolymers, the content of the first polymer block is preferably 65-95% by weight, more preferably 70-90% by weight, and the content of the second polymer block is preferably in the range of 5-35% by weight, more preferably 10 to 30% by weight, based on the weight of all block copolymers present in the component (b2-2).

In a preferred embodiment, all of the polymers or block copolymers forming the polymer mixture of polymer alloy (b2-1) and/or forming the 1, 2 or more block copolymers (b2-2) are (meth)acrylic polymers that are derived exclusively from monomers selected from acrylic acid, methacrylic acid, acrylates and methacrylates. A further preferred example of this preferred embodiment is where all first polymers or first polymer blocks are derived from n-butyl acrylate, and all second polymers or polymer blocks are derived from methyl methacrylate. This preferred embodiment and its further preferred example can of course be combined with other preferred embodiments, e.g. the preferred embodiment wherein the polymeric compatibilizer is not a (meth)acrylic polymer. Here, the polymeric compatibilizer may for instance be a polyolefin (such as an ethylene or propylene homopolymer or copolymer) modified with carboxylic acid groups, e.g. a maleic anhydride modified polypropylene.

Feedstock

The feedstock of the present invention may be formed by providing the sinterable particles and mixing them with the polymeric compatibilizer and the binder composition. This is preferably performed at elevated temperatures of 80-200° C. to reduce the viscosity of the binder composition and in order to form a dispersion of the sinterable particles in the binder composition. In practice, temperatures in the range of 120 to 180° C. have been proven effective. The temperature should be chosen such that a suitable mixing can occur and the polymeric components are sufficiently viscous in order to allow the preparation of a feedstock wherein the sinterable particles (P) are evenly distributed, yet should be low enough in order to avoid decomposition of the binder composition.

Without wishing to be bound by theory, due to the polymeric compatibilizer being a functional polymer having groups that are able to interact with the surface of the sinterable particles, the compatibilizer is believed to act as kind of surfactant and helps to homogeneously distribute the sinterable particles in the feedstock. It is further assumed that a surface interaction or reaction between the sinterable particles and the compatibilizer takes place as illustrated in FIG. 3a. This figure shows the FTIR (ATR) analysis of the polymeric compatibilizer (DuPont™ Fusabond® P353, a maleic anhydride-modified polypropylene) and sinterable particles (stainless steel 17-4 pH). As evidenced by the newly appearing peak around 1,700 cm$^{-1}$ (highlighted with a circle in FIG. 3a), a reaction between the maleic anhydride moiety of the polymeric compatibilizer and the surface of the stainless steel particles is believed to take place. The polar functional group of the compatibilizer thus coordinates to the surface of the sinterable particles, and the hydrophobic remainder of the compatibilizer (polypropylene chains in DuPont™ Fusabond® P353) allows achieving compatibility with the bulk of the binder composition formed by the component (b2). In consequence, the compatibilizer acts as dispersing aid.

Figure 3B:
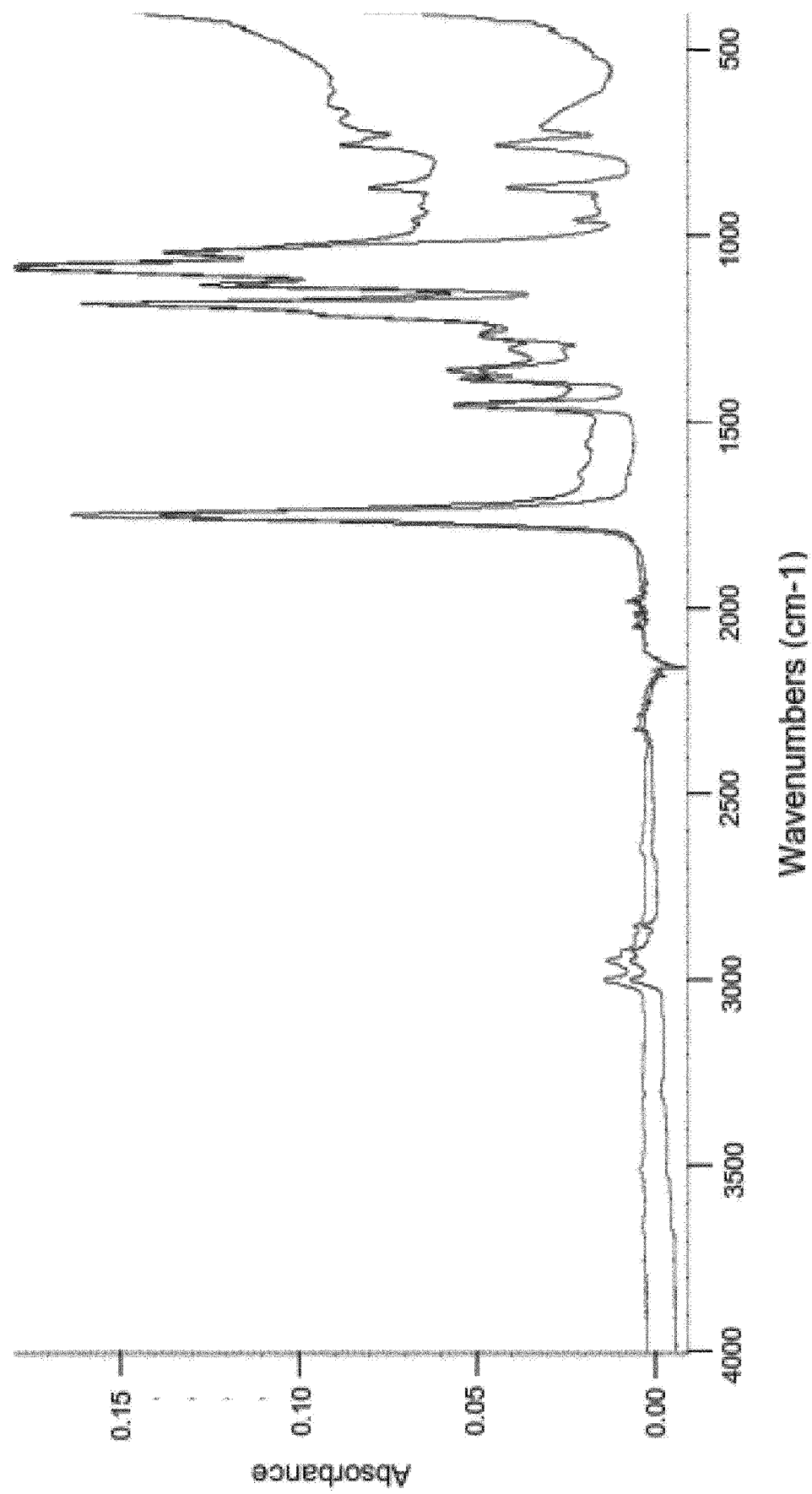
FIG. 3b shows the FTIR analysis of the commercial product Filamet™ and a PLA polymer (NatureWorks™

Conversely, FIG. 3b shows the FTIR (ATR) analysis of the commercial product Filamet™ of The Virtual Foundry® and a pure polylactic acid (NatureWorks® Biopolymer 2500HP). This commercial product, which currently claims to be the only filament feedstock capable of providing 99% metal sintered parts and contains copper particles, shows an FTIR spectrum that is largely identical to that of the polylactic acid, indicating that no interaction between the binder and the sinterable copper particles takes place. While Filamet™ is sold as a filament on a spool, this feedstock was found to have a rough and brittle surface and to require manual feeding for printing larger parts requiring more than 15 cm of filament. Also, a purchased spool of Filamet™ shows that the filament was broken in several positions, showing that Filamet™ has insufficient low temperature flexibility and is prone to breakage during shipping.

The kind of functional group in the compatibilizer is not particularly limited, and suitable functional groups can be chosen by a skilled person with due regard to the chemical nature of the sinterable particles surface. As such, carboxylic anhydride groups have been proven effective for a wide variety of sinterable particles. In the case of glass particles, for instance also the use of silane-modified polymeric compatibilizers may be contemplated.

Once the components of the feedstock have been properly mixed, the feedstock is processed to the desired shape. This shape very much depends on the additive manufacturing process for which the feedstock is intended, and for a fused filament fabrication method, the form of a filament is preferable. The diameter of the filament is not particularly limited and is generally in the range of 1 mm to 5 mm, preferably about 1.75 mm or about 2.85 mm, in order to be compatible with currently available 3D printers. The feedstock however can also be in the form of pellets having a diameter of e.g. 10 mm or less, preferably 5 mm or less, and they may have a size of as small as 1 mm or less, as some of the currently available 3D filament printers form the filament in situ within the printer.

In a preferred embodiment, the filament is spoolable. The present invention thus encompasses in one embodiment a spool carrying the feedstock of the present invention in filament form.

The feedstock of the present invention comprises the sinterable particles in an amount of 40% by volume or more of the feedstock. This allows reducing the shrinkage of the finally obtained sintered parts as compared to the green part produced e.g. by a 3D printer, which is caused by the removal of the binder composition. In order to reduce this shrinkage, the feedstock preferably comprises 45% by volume of more of the sinterable particles, further preferably 50% by volume or more. The upper limit of the amount of sinterable particles is not generally limited and is determined mainly by the requirements of the feedstock being processable in the printer and its extrudability. The practical upper limit may thus depend on the material of the sinterable particles and their shape and size, but is typically 85% by volume or less, preferably 80% by volume or less, and more preferably 75% by volume or less, relative to the volume of the feedstock. As far as not affecting the processability of the feedstock, higher amounts of sinterable particles are preferred in order to reduce the shrinkage during the debinding and sintering steps.

Additive Manufacturing Method

The additive manufacturing method of the present invention includes the following step:

A. Forming a first layer of a feedstock of the present invention on a support;
B. Forming at least one further layer on top of the first layer to form a green body;
C. Performing a debinding treatment in order to form a brown body from the green body obtained in step B; and
D. Simultaneously or subsequently to step C performing a sintering treatment to sinter the sinterable particles (P).

Figure 2:
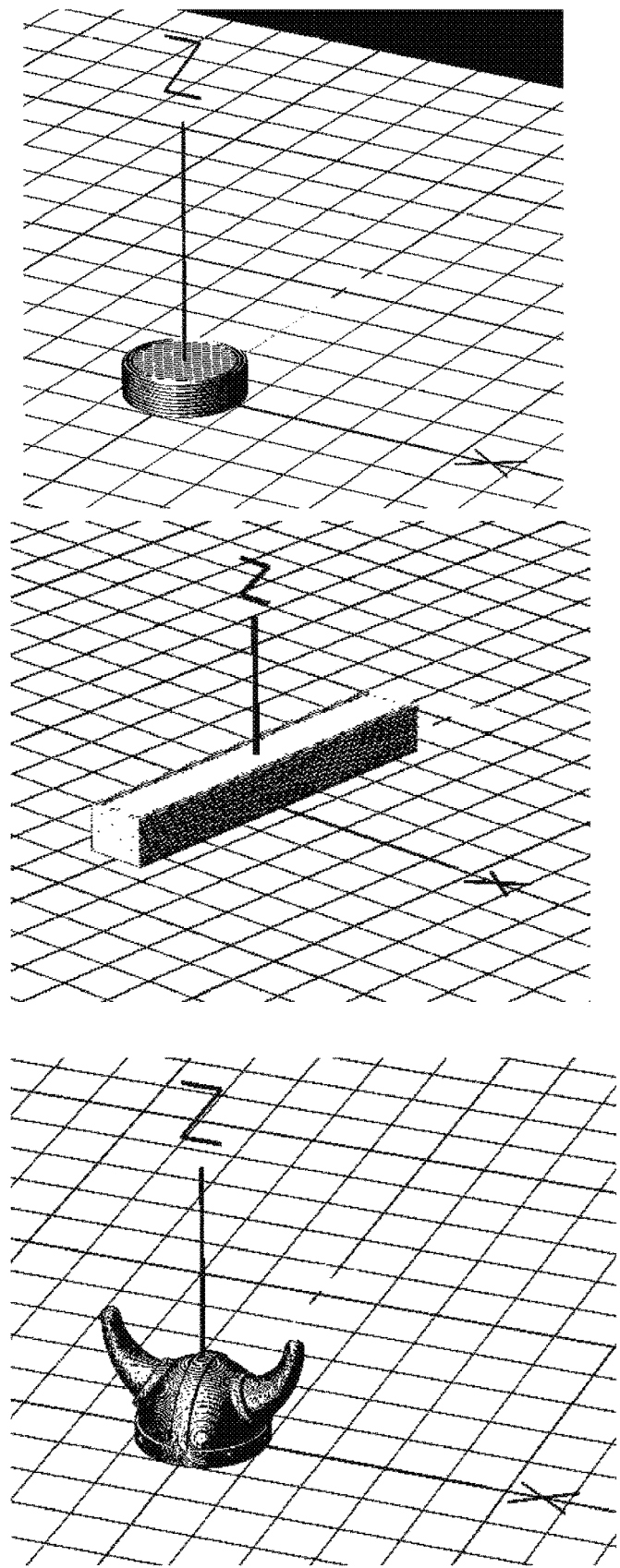
FIG. 2 shows the CAD design of test parts (from left to right: mini-puck, bar and Viking helmet) used in the Examples of the present invention.

Steps (A) and (B) can be performed with conventional 3D printer equipment, such as used in a fused filament fabrication method. An example of a suitable 3D printer is the FlashForge Dreamer™. Needless to say, the printer requires suitable operating instructions as to the item that is to be produced (see FIG. 2 showing suitable CAD designs for the test pieces of the Examples). Optionally, a printhead with two or more nozzles may be used, wherein one of the printhead nozzles provides the feedstock of the present invention, and another nozzle provides a polymeric support material that can be removed from the resulting green part, brown part or sintered body, e.g. by dissolution in a suitable solvent (preferably a polar solvent, which may be protic or preferably aprotic, e.g. acetone, ethyl acetate, dichloromethane, etc) or heat treatment. Providing such a preliminary support material could facilitate the manufacturing process for more complicated or fragile structures.

Once the green body has been formed, it is subjected to debinding and sintering steps. These steps remove the binder composition (debinding treatment) and fuse the sinterable particles (P) during the sintering process, at least at their boundaries. It results a 3 dimensional object that has a smaller size as compared to the green body.

The step of removing all or essentially of the binder composition is called debinding. This debinding can be achieved in various ways, e.g. by selective removal of the binder composition by solvent treatment (using a suitable solvent such as polar, protic or aprotic solvents, e.g. ethyl acetate, acetone, ethanol, methanol, isopropanol), catalytically, or thermally.

Preferably, debinding is achieved by solvent debinding (solvent extraction of the binder composition) or thermally, and more preferably thermally.

For solvent debinding, it is optionally possible to include a small amount (e.g. less than 10% by weight of the binder composition) of a polymer backbone material, as used for instance also in metal injection molding, to reduce the risk of collapse of the part prior to sintering. This backbone polymer is not soluble in the solvent used for the binder removal and provides a preliminary support for the part prior to sintering. The backbone polymer is then thermally removed during the sintering step. Suitable backbone polymers are well known in the art, and examples include amongst others LDPE, HDPE, or thermoplastic natural rubbers.

In a thermal debinding step, the green body is put in a furnace and slowly heated for sufficient time, typically in an inert atmosphere in order to avoid oxidation of the sinterable particle and/or the binder composition components. The use of an inert atmosphere is optional and can be omitted, in particular for oxides and ceramics. Conversely, for materials prone to oxidation and in order to avoid a rapid burn-off of the binder components the use of an inert atmosphere or low temperatures may be preferred.

A thermal debinding treatment needs to be performed at a temperature that is sufficient to depolymerize and/or evaporate the polymeric components of the binder composition. As such, the temperature needs to be increased to be within the range of 300° to 450° C., and it has been found that a slow temperature increase facilitates a smooth and efficient removal of the binder composition without causing too many distortions of the final object. While up to a temperature of e.g. 200° C. the heating may be performed rapidly, the heating rate from 200° C. or higher to the end temperature of the debinding treatment (within the range of 300 to 450° C.) is preferable 5° C./minor less, preferable 1° C./min or less, still further preferably 0.5° C./min or less, and most preferable 0.1° C./min or less. The temperature profile performed during the debinding treatment may or may not contain a temperature holding segment during which the temperature is held constant.

The entire duration of the debinding step C is generally 2 hours or more, preferably 4 hours or more. This time includes the heating from room temperature to the highest temperature of the heating treatment and optionally a temperature holding segment. The debinding treatment can be performed in an inert atmosphere (such as nitrogen or helium gas), a reducing atmosphere (such as hydrogen gas), or an oxygen containing atmosphere, such as air. In the simplest way, the debinding is performed in air. However, some sinterable particles may be prone to oxidation at high temperatures in oxygen-containing atmospheres, and hence for such sinterable particles (P) a debinding step in an inert atmosphere or a reducing atmosphere may be preferable. This applies for instance to iron particles. Conversely, oxidic species such as alumina or titania or ceramics may be debinded in air.

Subsequently to or continuous with the debinding treatment a sintering treatment is performed. In this step, the brown body obtained after the debinding treatment is sintered in order to connect the outer boundaries of the sinterable particles, e.g. by partial melting.

The temperature during the sintering treatment depends on the material of the sinterable particles and needs to be sufficient in order to cause a partial fusion or coalescence of the particles, but needs to be low enough in order to avoid complete fusion or melting of the particles which will lead to collapse of the 3 dimensional structure. Generally, temperatures in the range of 600 to 1.600° C. are useful, and preferable the temperature of the sintering process includes a maximum temperature of 1.100 to 1.500° C.

Similar to the debinding treatment, the sintering step can be performed in vacuum, an inert atmosphere (such as nitrogen, argon or helium gas), a reducing atmosphere (such as hydrogen) or an oxygen-containing atmosphere, including air.

It has been found that by performing the manufacturing method in accordance with the description above, using the feedstock of the present invention and employing a debinding treatment having a suitable heating rate in the temperature range between 200° C. and the end temperature of 300 to 450° C., an article having a high density as compared to the bulk material forming the sinterable particles can be obtained. For instance, it was generally possible to obtain articles having a relative density of 65% or more, preferably 70% or more or 75% or more, more preferably 80% or more, or even 85% or more of the bulk density of the material forming the sinterable particles (P). In the case of stainless steel, this means that the article can have a density of 5.5 g/cm$^3$ or more, preferably 6.0 g/cm$^3$ or more, and further preferably 6.3 g/cm$^3$ or more, determined by the method described in the Examples section.

Figure 6:
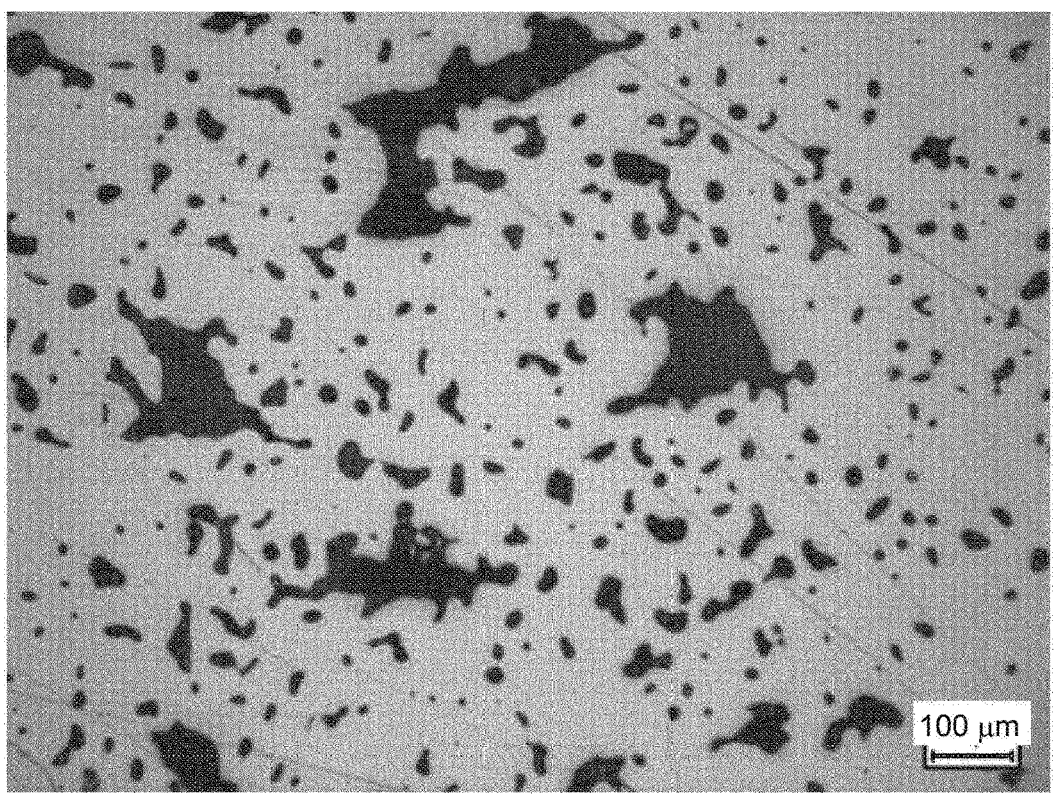
FIG. 6a shows the porosity of a test part as obtained using a slow debinding heat process, having a porosity of 17.8%.
FIG. 6b shows the porosity of a test part using a quick debinding cycle (porosity 30.5%).
Figure 6:
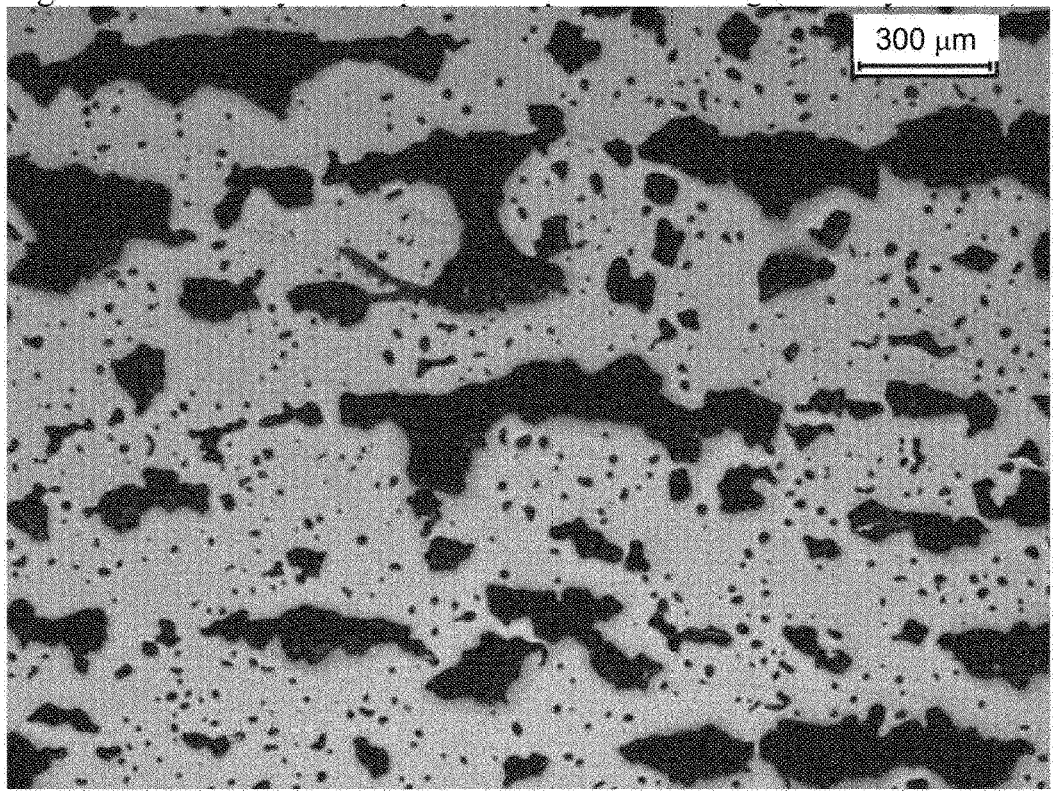

FIGS. 6a and 6b illustrate the porosity of a test part obtained using a debinding treatment with a slow temperature increase profile (6a) and a quick temperature increase profile (FIG. 6b). As derivable from these figures, the porosity of the obtained article can be greatly reduced by using a debinding treatment with a slow temperature increase, leading to a more stable and robust sintered article with high strength.

The present invention will now be described with reference to specific examples. These examples are however not intended to limit the scope of the invention in any way, which is solely determined by the appended claims.

The present invention will now be described with reference to specific Examples, which are however not intended to limit the scope of the invention in any way. A skilled person will easily recognize that various modifications can be made without departing from the spirit of the present invention.

EXAMPLES

Examples 1 to 10 and Feedstocks F1 to F10

I. Filament Feedstocks

The following filament feedstocks F were made by mixing the respective components in their respective amounts given in Table 1 below:

TABLE 1

Exemplary Feedstock Compositions

| Feed-stock | Comp. P: SS Powder [wt. % of total feedstock] | Kurarity LB550 [wt. % of binder composition] | Kurarity LA4285 [wt. % of binder composition] | Kurarity LA2140 [wt. % of binder composition] | Fusabond P353 [wt. % of binder composition] |
|---|---|---|---|---|---|
| F1 | 88.44 | 92 | — | — | 8 |
| F2 | 89.42 | — | — | 92 | 8 |
| F3 | 89.11 | — | 92 | — | 8 |
| F4 | 89.21 | — | 64 | 28 | 8 |
| F5 | 89.27 | — | 46 | 46 | 8 |
| F6 | 89.33 | — | 28 | 64 | 8 |
| F7 | 87.73 | 94 | — | — | 6 |
| F8 | 87.91 | 90 | — | — | 10 |
| F9 | 87.99 | 88 | — | — | 12 |
| F10 | 88.08 | 86 | — | — | 14 |

Herein, the compounds were as follows:
Sinterable Particles (P):
17-4 PH stainless steel, water atomized and sieved to a particle size of <45 μm. The water atomizing process yields particles of irregular shape, which would not likely be easily 3D printed because of its poor flow properties compared to spherical powders. However, the debinding step after printing could be assisted by the irregular shape since all of the interlocking points of the powder could help retain the part shape while slowly removing the binder.

The amounts of the sinterable particles were chosen such that content thereof was 54% Vol. % of the feedstock.

Binder Composition (B):

(b1) Polymeric compatibilizer FUSABOND P353™ (DuPont), a maleic anhydride (MAH) grafted polypropylene having a density of 0.904 g cm³, a Melt Flow Rate (at 160 C and 325 g, measured according to ASTM D1238) of 22.4 g/10 min, a melting point of 135° C. (ASTM D3418) and a Vicat Softening Point of 112° C. (ASTM D 1525).

(b2) polymeric binder components:
  Kurarity LB550™ is a 50:50 (by weight) mixture of Kurarity LA2250™ and Kurarity LA4285™. The overall content of units derived from methacrylic acid is 15-18% by weight, the remainder being units derived from n-butyl acrylate.
  Kurarity LA2250™ is a PMMA (poly methyl methacrylate)/pnBa(poly n-butyl acrylate) triblock copolymer of the structure B-A-B, where B is a polymer block obtained from methyl methacrylate and A is a polymer block obtained from n-butyl acrylate, wherein the total content of the PMMA blocks B is about 10% by weight.
  Kurarity LA4285™ is a PMMA (poly methyl methacrylate)/pnBa(poly n-butyl acrylate) triblock copolymer of the structure B-A-B, where B is a polymer block obtained from methyl methacrylate and A is a polymer block obtained from n-butyl acrylate, wherein the total content of the PMMA blocks B is in the range of 25-30% by weight of the triblock copolymer.
  Kurarity LA2140™ is a PMMA (poly methyl methacrylate)/pnBa(poly n-butyl acrylate) triblock copolymer of the structure B-A-B, where B is a polymer block obtained from methyl methacrylate and A is a polymer block obtained from n-butyl acrylate, wherein the total content of the PMMA blocks B is in the range of 5-8% by weight of the triblock copolymer.

Feedstock Preparation

The feedstocks were produced using a HAAKE Polylab QC mixer. First, the polymeric compatibilizer was pre-mixed with the SS particles to provide a coating. Then, the entire binder component(s) were mixed with 75% of the pre-coated SS particles at 190° C. and at 100 rpm for 15 minutes. Then, the remaining 25% of the pre-coated SS particles was mixed into the feedstock in the HAAKE Polylab QC mixer at 190° C. and run for another 60 minutes at 100 rpm. The feedstock was then cooled and granulated using a Wittman MAS 1 Granulator.

Subsequent tests were conducted without a pre-coating of the SS particles with the compatibilizer by blending all of the components at once. The obtained feedstock had the same appearance and properties, so that a pre-coating of the sinterable particles was established to be of no particular relevance for SS particles. It is however believed that a pre-coating of the sinterable particles with the polymeric compatibilizer might improve the dispersibility of sinterable particles other than stainless steel, in particular those having an oxidic surface.

II. Filament Production

With the prepared feedstocks were filament made using a Göttfert MI-2 Melt Indexer. The principle was as follows: the feedstock was kept in a vertical cylinder with a die of 1.7 mm at the bottom. Heat (180-210° C. depending on sample) was applied and held steady, thereby turning the feedstock into a viscous mass, and a load of 21.6 kg was placed on a piston which then forced the viscous feedstock to flow through the die.

Longer filaments were made using a Göttfert Rheograph 2003 to test the spooling characteristics of the feedstocks. While generally any suitable temperature may be used, the method employed for the present Examples uses a fixed temperature of either 210° C., 200° C. or 190° C. over a cylinder packed with a material which is pressed through a capillary (d=1.75 mm, h=30 mm) at a speed of 0.2 mm/s. The suitable temperature can be chosen based on the viscosity and cohesive properties of the feedstock at the respective temperature. The material load was around 300 g feedstock/run, varying accordingly to feedstock density. When the filament came out of the capillary it was manually spooled on plastic spools having a diameter of about 2-5 cm for 3D-printing. The material generally and did not tend to break during extrusion.

Examples 1A and 1B Filament Production Using Feedstock F1

Example 1A: Production in the Göttfert MI-2 Melt Indexer

A filament could be successfully obtained by setting the temperature to 210° C. The filament was continuous, flexible and had a good surface finish.

Example 1B: Production in the Göttfert Rheograph 2003

A filament could be successfully obtained by setting the temperature to 210° C. The filament was continuous and very flexible and had a good surface finish.

Examples 2A and 2B: Filament Production Using Feedstock F2

Example 2A: Production in the Göttfert MI-2 Melt Indexer

First attempt at making filament at 190° C. in the Göttfert MI-2 Melt Indexer failed. The filament had a very bad surface finish and no continuous filament was produced. Second attempt at 180° C. produced a smooth and very flexible filament that did not brake during extrusion and had a slow and steady pace.

Example 2B: Production in the Göttfert Rheograph 2003

First attempt at spooling at 200° C. in the Göttfert Rheograph 2003 failed. The filament was fast flowing and broke easily with a rough surface finish. It was hard to spool and to get a continuous filament, although very flexible.

A second attempt at spooling at 190° C. was successful. It had good flow, was very easy to spool, had a smooth surface finish throughout and made one continuous filament of the whole sample.

Examples 3A and 3B: Filament Production Using Feedstock F3

Example 3A: Production in the Göttfert MI-2 Melt Indexer

The filament was extruded at 210° C. in the Göttfert MI-2 Melt Indexer successfully. It was slow flowing with a very smooth surface finish and one continuous filament on the whole sample. It was however very brittle at room temperature and showed almost no flexibility.

Example 3B: Production in the Göttfert Rheograph 2003

Filament spooled at 200° C. in the Göttfert Rheograph 2003. It did not produce a filament in the beginning, but only very short pieces which had very bad surface finish. It was slow flowing and got better with time. In the end a long filament with good surface finish was extruded that was easy to spool. It was very brittle at room temperature and showed little flexibility.

Examples 4A and 4B: Filament Production Using Feedstock F4

Example 4A: Production in the Göttfert MI-2 Melt Indexer

First attempt of making filament at 210° C. resulted in fast flow, a very bad surface finish, some flexibility and frequent brakes of the sample. Second attempt at making filament at 190° C. was successful but extremely slow flowing. It had very smooth surface finish and produced a continuous filament of the whole sample. Some flexibility was shown but there were cracks forming weak points.

Example 4B: Production in the Göttfert Rheograph 2003

The filament could be spooled at 200° C. with some success. The filament showed good flow and decent surface finish with some roughness. The filament occasionally broke during spooling but some continuous pieces of filament could be spooled. It had some flexibility but with cracks forming weak points.

Examples 5A and 5B: Filament Production Using Feedstock F5

Example 5A: Production in the Göttfert MI-2 Melt Indexer

Filament could successfully be extruded at 190° C. The material showed good flow and decent surface finish with some roughness. One continuous filament of the whole sample with good flexibility could be formed.

Example 5B: Production in the Göttfert Rheograph 2003

Filament could be successfully spooled at 200° C. It had good flow and good surface finish but with some cracks. The filament was easy too spool and had good flexibility, although the cracks form weak points.

Examples 6A and 6B: Filament Production Using Feedstock F6

Example 6A: Production in the Göttfert MI-2 Melt Indexer

The filament extruded at 190° C. in the Göttfert MI-2 Melt Indexer showed bad surface finish and got worse and worse as the extrusion proceeded. It broke often during extrusion but made a small piece of continuous filament with good flexibility.

Example 6B: Production in the Göttfert Rheograph 2003

First attempt at spooling at 200° C. failed. It was fast flowing, broke often and was hard to spool, but showed decent surface finish. A second attempt at spooling at 190° C. was successful. It showed good flow, was very easy to spool and had smooth surface finish throughout. One continuous filament of the whole sample was able to be made.

Examples 7A and 7B: Filament Production Using Feedstock F7

Example 7A: Production in the Göttfert MI-2 Melt Indexer

The filament extruded at 190° C. failed. It broke frequently and had very rough surface finish. It was overall a flexible filament with good flow but was not usable because of the roughness.

Example 7B: Production in the Göttfert Rheograph 2003

The filament was spooled at 200° C. with some success. It had good flow but bad surface finish in the beginning, which got better and better as it was extruded with decent surface finish in the end. It was able to be spooled as a long continuous filament. It had good flexibility but with some cracks forming weak points.

Examples 8A and 8B: Filament Production Using Feedstock F8

Example 8A: Production in the Göttfert MI-2 Melt Indexer

The filament was extruded at 190° C. in the Göttfert MI-2 Melt Indexer with some success. It showed good flow but with bad surface finish. Extrusion resulted in one continuous filament of the whole sample with good flexibility but with some cracks forming weak points.

Example 8B: Production in the Göttfert Rheograph 2003

The filament was spooled at 200° C. successfully. It showed good flow and was easy to spool with smooth surface finish and good flexibility but with some cracks forming weak points.

Examples 9A and 9B: Filament Production Using Feedstock F9

Example 9A: Production in the Göttfert MI-2 Melt Indexer

The filament was extruded at 190° C. It was slow flowing and broke often with bad surface finish throughout, good flexibility but many cracks forming weak points. It made one continuous filament after a few tries.

Example 9B: Production in the Göttfert Rheograph 2003

The filament was spooled at 200° C. in the Göttfert Rheograph 2003 successfully with good flow, good surface finish and was easy too spool. It was flexible but contained cracks forming weak points.

Examples 10A and 10B: Filament Production Using Feedstock F10

Example 10A: Production in the Göttfert MI-2 Melt Indexer

The filament was extruded at 190° C. in the Göttfert MI-2 Melt Indexer with very rough surface finish. It was fast flowing and never broke, but obtained completely unusable surface finish. However it showed good flexibility even though the surface finish leads to weak points in the filament.

Example 10B: Production in the Göttfert Rheograph 2003

The filament was spooled at 200° C. successfully. It had good flow but rough surface finish in the beginning and better and better over time to be decent in the end. It was easy to spool with few breaks on the sample and showed some flexibility.

The following Table 2 shows the results and observations of the extrusion of the feedstock to form filaments in the Göttfert MI-2 Melt Indexer using a modified capillary size in order to obtain a filament diameter suitable for the printer (1.75 mm diameter) (A Examples).

TABLE 2

Feedstock Extrusion and Filament Production in Göttfert MI-2 Melt Indexer

| Sample | Extrusion temperature (° C.) | Surface finish | Flexible/ Brittle | Continuous filament obtained |
|---|---|---|---|---|
| Ex. 1A | 210 | Good | Flexible | Yes |
| Ex. 2A | 180 | Good | Very flexible | Yes |
| Ex. 3A | 210 | Good | Very brittle | Yes |
| Ex. 4A | 190 | Good | Some flexibility with cracks | Yes |
| Ex. 5A | 190 | Decent | Flexible | Yes |
| Ex. 6A | 190 | Bad | Very flexible | No |
| Ex. 7A | 190 | Bad | Flexible | No |
| Ex. 8A | 190 | Bad | Flexible with cracks | Yes |
| Ex. 9A | 190 | Bad | Flexible with cracks | No |
| Ex. 10A | 190 | Bad | Flexible | Yes |

The following Table 3 shows the results of filament production using a Göttfert Rheograph 2003 at different temperatures (B Examples):

TABLE 3

Feedstock Extrusion and Filament Production in Göttfert Rheograph 2003

| Sample | Extrusion temperature (° C.) | Surface finish | Flexible/ Brittle | Continuous filament obtained |
|---|---|---|---|---|
| Ex. 1B | 210 | Good | Very flexible | Yes |
| Ex. 2B | 190 | Good | Very flexible | Yes |
| Ex. 3B | 200 | Good | Very brittle | Yes |
| Ex. 4B | 200 | Decent | Brittle | No |
| Ex. 5B | 200 | Good | Brittle | Yes |
| Ex. 6B | 190 | Good | Very flexible | Yes |
| Ex. 7B | 200 | Decent | Some flexibility with cracks | Yes |
| Ex. 8B | 200 | Good | Flexible | Yes |
| Ex. 9B | 200 | Good | Flexible with cracks | Yes |
| Ex. 10B | 200 | Good | Flexible | Yes |

The results shown in Tables 2 and 3 show that with all of the feedstocks, a continuous filament could be obtained. If an initial attempt failed, a continuous filament could be produced by changing the extrusion temperature and/or the apparatus used.

III. Printing

For each of the feedstocks, the filament obtained from the successful filament production tests having the best appearance was selected and tested as to whether it was able to be used in a 3D Fused Filament Printer The 3D printer used was a FlashForge Dreamer™, which is a consumer desktop 3D printer using Fused Filament Fabrication as printing technology. It has a temperature controlled print platform, offers a build volume of 230*150*140 mm and a layer resolution from 0.1 to 0.5 mm. The nozzle diameter is 0.4 mm. The printer requires filaments with a diameter of about 1.75 mm.

Before being printed, the test pieces needed to be computer-designed. For this purpose, the CAD software PTC Creo Parametric™ 3.0 was used, but of course other software can be used, too.

The first test piece was a cylinder with a diameter of 10 mm and a height of 3 mm. It was called "mini puck" for the rest of the study. The second component was a rectangular bar with a width and height of 6 mm and a length of 36 mm, called TRS bar, and the third a Viking helmet. FIG. 2 shows the STL files used in the study. All three parts were saved as .STL file and the chord height was minimized as much as possible. The angle control and the step size were left as default.

The .STL files were then imported into the slicing software Simplify3D™ to translate 3D CAD models into instructions that the printer understands. The software cuts the CAD model into cross-sections called layers and defines the tool path that the print heads need to follow during the printing as well as other printing settings. The settings are summarized in Table 4.

TABLE 4

Printing Settings

| Print quality | Primary layer height [mm] | Infill [%, pattern] | Temperature of print plat form [° C.] | Temperature of extruder [° C.] | Default print speed [mm/min] | X/Y axis movement speed [mm/min] |
|---|---|---|---|---|---|---|
| Fast | 0.3 | 100%, rectilinear | 105 | 250 | 1600 | 2200 |
| High | 0.1 | 100%, rectilinear | 105 | 250 | 1600 | 2200 |

The filaments prepared as described above were subject to printing tests with the following results:

Example 1C: Printing Test with Filament Obtained from Feedstock F1

The filament obtained in Example 1B printed nicely and normally needed no help feeding. It produced green parts with very nice surface finish and was printed with both fast and high printing quality. Many mini pucks, Viking helmets, TRS bars and even a larger body of gear shape could be printed very nicely.

Example 2C: Printing Test with Filament Obtained from Feedstock F2

The filament obtained in Example 2B (second attempt at 190° C.) could not be printed easily. The filament was too flexible and soft and was thus difficult to feed. The feeding gear was easily blocked by the filament and jammed the printer. After some attempts, a mini puck could be printed with decent results and surface finish.

The material is thus suitable for printing, but requires care during the feed operation if more complex structures are to be produced.

Example 3C: Printing Test with Filament Obtained from Feedstock F3

The filament obtained in Example 3B could not easily be printed. The filament was too brittle and broke various times during print head movements. Mini pucks could be printed with decent results and decent surface finish, but more complex structures were difficult to produce due to filament breakage before entering the printhead. TRS-bars failed twice.

The filament was printable with decent results but too brittle for the printer used. This problem may be overcome by increasing the relative amount of the first polymer block having a Tg of −20° C. or lower, as this improves flexibility at lower temperatures.

Example 4C: Printing Test with Filament Obtained from Feedstock F4

The filament obtained in Example 4B could successfully be printed. There were no problems and the filament could be easily fed with good results. The surface finish was good with only minor flaws in it and very easy to work with. All geometries were printed successfully and the weak points/brittleness of the filament proved to not be an issue for this process.

Example 5C: Printing test with filament obtained from Feedstock F5

Printing was somewhat successful with the filament obtained in Example 5B. Even with some help during the feeding, the first layers of the mini puck and the Viking helmet could not be printed with decent surface finish.

With this filament, is was not possible to print a TRS bar. Halfway through the printing it smeared, clogged and stopped printing. Filament was not very easy to work with, although cracks/brittleness were not an issue.

Example 6C: Printing Test with Filament Obtained from Feedstock F6

Printing was a success with the filament obtained in Example 6B at 190° C. It produced very good results and no problems arouse while printing. It needed no help with anything and produced a good and even result on all geometries. The filament provided very good surface finish with very minor defects and was easy to work with. The filament was very printable with good results.

Example 7C: Printing Test with Filament Obtained from Feedstock F7

Printing was a success with the filament obtained in Example 7B. The filament started easily and printed the first layers without a problem. Printed with good results and good even surface finish, very good to work with. Printed excellent mini pucks and TRS bars but the Viking helmet had some defects, with a still decent surface finish but not as good as the other geometries.

Example 8C: Printing Test with Filament Obtained from Feedstock F8

Printing was partly successful with the filament obtained in Example 8B. It needed some help feeding for the first layers and subsequently the surface finish in the beginning was not excellent. Once it got going, it printed by itself with decent surface finish. The same on all geometries printed, needed help to start and then it printed by itself without a problem. Filament was printable but with difficulties in handling.

Example 9C: Printing Test with Filament Obtained from Feedstock F9

Printing was somewhat successful with the filament obtained in Example 9B. It was not very easy to work with but produced a decent result. It needed help feeding in the start and sometimes randomly in the process as well, which led to bad surface finish in those areas.

The filament was brittle and easy to break while helping feeding it. It did not flow well enough out of the nozzle so the layers did not stick together as well as other filaments tested, which led to separation of the layers when removing the piece from the platform. Especially Viking helmet had bad surface finish. It was printable with help but produced results of moderate quality.

Example 10C: Printing Test with Filament Obtained from Feedstock F10

Printing was partly successful with the filament obtained in Example 10B. It was not very easy to work with but produced a decent result. It needed help feeding in the start and sometimes randomly in the process as well, which led to a partly impaired surface finish in those areas.

The filament was generally somewhat brittle and easy to break while helping feeding it. It did not flow very well out of the nozzle so the layers did not stick together as well as other filaments tested, which partially led to separation of the layers when removing the piece from the platform. Especially the Viking helmet had bad surface finish. It was printable with help, but produced results of only moderate quality.

The following table 5 provides an overview over the feedstock compositions and the printability. Here, the feedstocks were rated as follows:

A=excellent in both printability and surface finish
B=printable with minor problems, decent surface finish
C=printable with more severe problems, acceptable surface finish
D=not printable

TABLE 5

Feedstock Compositions and Printability

| Feedstock | Ability to perform printing | Need help feeding | Surface finish of printed object | Easy to work with | General Rating |
|---|---|---|---|---|---|
| F1 | Success | No | Very good | Yes | A |
| F2 | Problematic | Yes | Decent | No | C |
| F3 | Problematic | No | Decent | No | C |
| F4 | Success | No | Good, minor flaws | Yes | A-B |
| F5 | Somewhat successful | Yes | Decent | No | B |
| F6 | Success | No | Very good | Yes | A |
| F7 | Success | No | Good | Yes | A |
| F8 | Success | No | Very good | Yes | A |
| F9 | Somewhat successful | Yes | Decent | No | B |
| F10 | Somewhat successful | Yes | Bad | No | B-C |

It follows from the results provided in Table 5 that all filaments produced could successfully be used in the printing process. None of the filaments qualified as D (not printable).

Better printability scores (A,B) where obtained when in the polymeric binder component, the content of the second polymer block having a Tg in the range of 60° C. or higher (PMMA) is in the range of 10 to 25% by weight of each block copolymer (as in LB 550 used in Feedstocks 1, 7-10) or wherein two block copolymers are used and the total amount of the polymer block having a Tg in the range of 60° C. or higher is in the range of 10 to 25% by weight of all block copolymers (Feedstocks F4, F4, F6).

Looking at Table 5 on F2-F6, it is clear that F2 and F6 produced a superior filament based on surface finish, flexibility and their ability to produce a continuous filament. F3, F4 and F5 all produce somewhat brittle filaments on the spools.

The Examples not only explored suitable polymeric binder components, but also the suitable amounts of polymeric compatibilizer Fusabond P353 (Feedstocks 1 and 7 to 10). Looking at Table 5, one notes that out of F1 and F7-F10, F1 (content=8%) and F8 (content: 10%) were superior. These could produce a continuous, flexible filament with good surface finish on a spool. In Table 5 it can be observed that the distinguishing factor for F8 was a Fusabond P353 amount of 10 wt % of binder. F7 had 6 wt % of the binder and F9 had 12 wt % of the binder and they both produced a somewhat inferior filament. While thus a content of polymeric compatibilizer of 5-15% of the binder composition (B) is suitable, better results are obtained if the amount thereof is between 6 and 12% by weight, further preferably 6 to 10% or less by weight of the binder composition (B).

IV. Production of Sintered Bodies (Debinding and Sintering)

The parts printed by the 3D printer (including the binder composition and the sinterable particles, also referred to as green body) need to be freed from the binder composition, and the particles need to be fused by sintering, in order to obtain the desired final product. In the present Examples, the following cycle was used under an $N_2$ atmosphere (thermal debinding)):

Heating at 0.1° C./minute to 300° C., hold for 30 minutes,
Heating at 0.1° C./min to 350° C., hold for 30 minutes,
Heating at 0.1° C./min to 375° C., hold for 16 h.

The obtained debinded parts (also called brown body) were then taken out from the furnace and visually inspected. The debinding treatment was found to lead to no or very little distortion of the object, and the remainder of organic components was less than 0.5% by weight.

The debinded objects were then subjected to a sintering process in order to cause the sinterable particles to fuse. The following sintering conditions (under $H_2$ atmosphere) were used:

Heating from RT at 5° C./min to 600° C., hold 30 min;
Heating at 5° C./min to 800° C., hold for 1 h;
Heating at 5° C./min to 1350° C., hold for 2 h.

All obtained parts were of good visual appearance and had moderate or low porosity. The obtained parts exhibited porosities between 12.5-30%, mostly between 18-26%, depending on the complexity of the shape and the infill factor. For the stainless steel parts, this results in an apparent density of 5.4-6.9 g/cm$^3$, which equates to about 70-90% of the density of bulk stainless steel. FIG. 6A shows an enlarged view of the structure.

Further, for two TRS bars produced using Feedstock F1, the shrinkage of the final parts as compared to the green part (caused by removal of the binder composition and the fusion of the sinterable particles at their boundaries) was determined. Compared to the green part, the final product was by 21-24% smaller in length, height and width. The shrinking was established to be almost uniform, with a slightly higher shrinkage in height direction due to gravity. The test bars where further examined with regard to their Fracture Load (about 2500 N) and Transverse Rupture Strength (about 1050 MPa), showing that the obtained materials have high strength and do not suffer from significant structural deficiencies at the boundaries of the filaments.

In a study aimed at examining the influence of the debinding treatment, the following debinding treatment was used (also under $N_2$ atmosphere):

Heating at 1° C./min to 375° C., hold for 10 h

The sintering treatment was the same as above. Thermogravimetic Analysis showed a residual content of organics of about 5% by weight. Further, the porosity was in the order of 30-40% with a sintered density of 5.8 g/cm$^3$ or higher, which equates to 76% of the density of bulk stainless steel. FIG. 6B shows an enlarged view of the structure obtained using this debinding temperature profile having a relatively high average temperature increasing rate.

The above analysis shows that a slower heating range during a temperature increasing segment allows obtaining a higher density of the resulting product, which translates into higher strength and rigidity.

Examples 11 to 20

In order to evaluate the suitability of the binder composition to provide a feedstock for an additive manufacturing process and in particular printable filaments for Fused Filament Fabrication using other materials as sinterable particles, Examples 11 to 20 were conducted with the binder composition of Feedstock F1/Example 1 (92% Kurarity LB550, 8% Fusabond P353). This binder was chosen in view of the good results obtained in Example 1. The binder composition was compounded with the following sinterable particles in order to obtain a feedstock for additive manufacturing and testing as to whether a filament suitable for a 3D printer can be obtained:

TABLE 6

Compositions of Feedstocks F11 to F20 (Remainder: Binder composition of Feedstock F1 - 92% by weight Kurarity LB550, 8% by weight Fusabond P353)

| Feedstock | Sinterable Particle Type | Type | Amount (wt.-%) |
|---|---|---|---|
| F11 | MIM0103A: Water atomized low alloyed metal powder sieved at 45 µm. X50 = 32 µm, irregular particle shape. Mix of 28.9% X-325A + 69.1% X-325M +1.9% Fe3P. obtained in accordance with WO2012089807 A1 | Metal | 88.06 |
| F12 | Arashk 17-4PH: A stainless steel powder containing 17 wt % Cr and 4 wt % Ni, high pressure water atomized, precipitation hardened, sieved at 20 µm. X50 = 14.9 µm. Particle shape is irregular. | Metal | 87.87 |
| F13 | CIP BC: Reduced carbonyl iron particles with a particle size X50 = 5.6 µm, Particle shape is spherical. Made by Sintez | Metal | 88.10 |
| F14 | CATALOX ® HTFa-101 ALUMINA. Aluminium oxide with a particle size of 5-10 µm | Ceramic | 75.13 |
| F15 | ASC300: Fine water atomized press powder with irregular particles sieved at 63 µm, X50 = 38 µm. Made at Hoganas Sweden AB. | Metal | 88.12 |
| F16 | ASC100.29: Coarse water atomized press powder with irregular particles sieved at 212 µm, X50 = 80 µm. Made at Hoganas Sweden AB | Metal | 88.08 |
| F17 | Commercially pure titanium powder, solid state reduced with irregurlar particle shape, X50 = 28-35 µm | Metal | 80.15 |
| F18 | GAS 316L Carpenter: Gas atomized stainless steel powder. X50 = 10.6 µm. Particle shape is spherical | Metal | 88.16 |
| F19 | Atmix 316L PF3: Water atomized precipitation hardened stainless steel. X50 = 3.5 µm. Particle shape is rounded. Made by Atmix. | Metal | 88.06 |
| F20 | TiO$_2$. Titanium dioxide sieved at 44 µm, X50 = 3 µm. Made at AMG Superalloys UK Limited | Ceramic | 80.19 |

All feedstocks were prepared with a solid (i.e., sinterable particle) loading of 54 Vol.-%.

All feedstocks were produced using a HAAKE Polylab QC mixer. First the binder composition was mixed with 75% of the total amount of the sinterable particles at 190° C. and at 100 revolutions per minute and mixed for 15 minutes.

Then the remaining 25% of sinterable particles was mixed into the feedstock in the HAAKE Polylab QC mixer and mixed for another 60 minutes at the same speed and temperature. The feedstock was then cooled and granulated using a Wittman MAS 1 Granulator.

The exception was the Ti powder, since it is highly flammable. It was therefore inserted together with the binder composition all at once without stirring at room temperature under Ar flow. The chamber was flushed carefully with Ar right before closing it and only then the heating started. After mixing, it was treated like any other feedstock.

After testing the general suitability to form filaments in the Göttfert MI-2 Melt Indexer at temperatures in the range from 160-200° C., filaments were produced in the Göttfert Rheograph 2003 and spooled. With all feedstocks F11-F20, continuous filaments having a good surface finish could be obtained. Exceptions are F14 containing alumina, which had minor surface flaws, and F19, which gave excellent results. All feedstocks are thus generally suitable for an additive manufacturing process. Most of the feedstocks could be printed in the FlashForge Dreamer™ 3D printer using the same settings as in Example 1-10, though with somewhat different results. These are summarized in Table 7 below:

TABLE 7

Printing tests with Feedstocks F11-F20

| Ex. | Particles/ Feedstock | Printing | Need help feeding | Surface finish of printed object | Easy to work with | General rating |
|---|---|---|---|---|---|---|
| 11 | F11/MIM0103 | Failed | Could not feed | — | — | D |
| 12 | F11/Arash E59 | Partly successful | No | Decent | Yes | B |
| 13 | F13/CIP-BC | Failed | Yes | Bad | No | C |

TABLE 7-continued

Printing tests with Feedstocks F11-F20

| Ex. | Particles/ Feedstock | Printing | Need help feeding | Surface finish of printed object | Easy to work with | General rating |
|---|---|---|---|---|---|---|
| 14 | F14/Al2O3 | Successful | No | Good, flexible | Yes | A-B |
| 15 | F15/ASC300 | Successful | Yes | Good | No | B |
| 16 | F16/ASC100.29 | Failed | Could not feed | — | — | D |
| 17 | F17/Titanium | Partly successful | Yes | Decent | No | C |
| 18 | F18/GAS 316 L Carpenter | Highly successful | No | Good | Yes | A |
| 19 | F19/ Atmix 316 L | Highly successful | No | Very good | Yes | A |
| 20 | F20/ TIO$_2$ | Successful | No | Good | Yes | A |

The following observations were made in the printing tests:

Example 11

Printing failed, as the feedstock could not be fed through the nozzle. This is believed to be caused by the nature of the sinterable particles (MIM0103), which is a mixture of three different particle types, two of which have small average diameter and large average diameter. This presumably led to clogging of the printer nozzle. This problem would presumably not occur at larger printer nozzles.

Example 12

Printing was considered somewhat successful with this filament. It started easily and needed no help in the beginning. It was possible to print all components with decent results. It however occurred smearing on the nozzle, affecting the surface finish on the components negatively, and some problem with the flow through the nozzle occurred. This problem could possibly be solved by slightly increasing the temperature of the printhead or reducing the viscosity by reducing the relative amount of the polymer or polymer clock having a Tg of 60° C. or higher.

Example 13

This filament was somewhat brittle at room temperature, and manual help to start printing was needed. It was possible to print components, but the filament smeared on the nozzle which resulted in a bad surface finish. The biggest problem that occurred with this filament was that it did not flow through the nozzle and that it smeared a lot affecting the surface finish. These problems may be overcome by increasing the temperature of the print head, increasing the nozzle diameter and/or increasing the flexibility of the feedstock by increasing the amount of polymer blocks or polymer having a Tg of −20 C or lower.

Example 14

Printing with this filament was a success. There was no feeding or extrusion problem.

Example 15

Printing was successful with this filament after initial problems with the feeding, leading to a poor surface finish. Once it got going it printed all components with good surface finish.

Example 16

Printing failed with filament F16. It jammed the printer twice when trying to feed it through the nozzle. It could not flow and it was not possible to print anything with this filament. This is believed to be due to the large particle size of the sinterable particles of up to 147 μm. A larger diameter of the printing nozzle or a further atomization step of the particles prior to feedstock production are believed to reduce or eliminate these problems.

Example 17

Printing of a complete part was only partly successful. At first, problems with feeding and extrusion through the printer nozzle occurred. After starting difficulties, parts of a test piece could successfully be printed.

Example 18

Printing Filament F18 was fully successful. It was no problem to feed the filament through the nozzle. Product quality was very good.

Example 19

Printing Filament F19 was fully successful. It was not necessary to help feeding, and product quality was excellent. In addition, it was possible to start a new print even though the printer was turned off without unloading the extruder, which often creates problems.

Example 20

Despite Filament F20 being slightly brittle, printing was fully successful.

The following conclusions can be drawn from the Examples 1-20:

Fine powders with spherical particles (F18 and F19) offer the best flow properties, making the feedstock easily spoolable and the filament flexible and printable without problems. Particles performing the best during these experiments were fine, spherical stainless steel powders. However, both irregularly shaped fine stainless steel powders and fine ceramic powders were decently printable and even the finer ASC300 powder was somewhat printable even though it is a press powder. Too large particle diameters may lead to clogging and printing problems.

All feedstocks using a binder composition (B) in accordance with the present invention and using different types of sinterable particles could be processed to filaments suitable for additive manufacturing methods. In order to adapt the compositions to a particular 3D printer model, some minor adjustments to the composition may be necessary, in particular by adjusting the particle size of the sinterable particles, the filament thickness, the relative amounts of polymers or polymer blocks having a Tg of −20° C. or lower and polymers or polymer blocks having a Tg of 60° C. or higher, or the relative amount of compatibilizer. Such modifications are however a routine task for a person skilled in the art and can be evaluated based on routine experiments.

Figure 4:
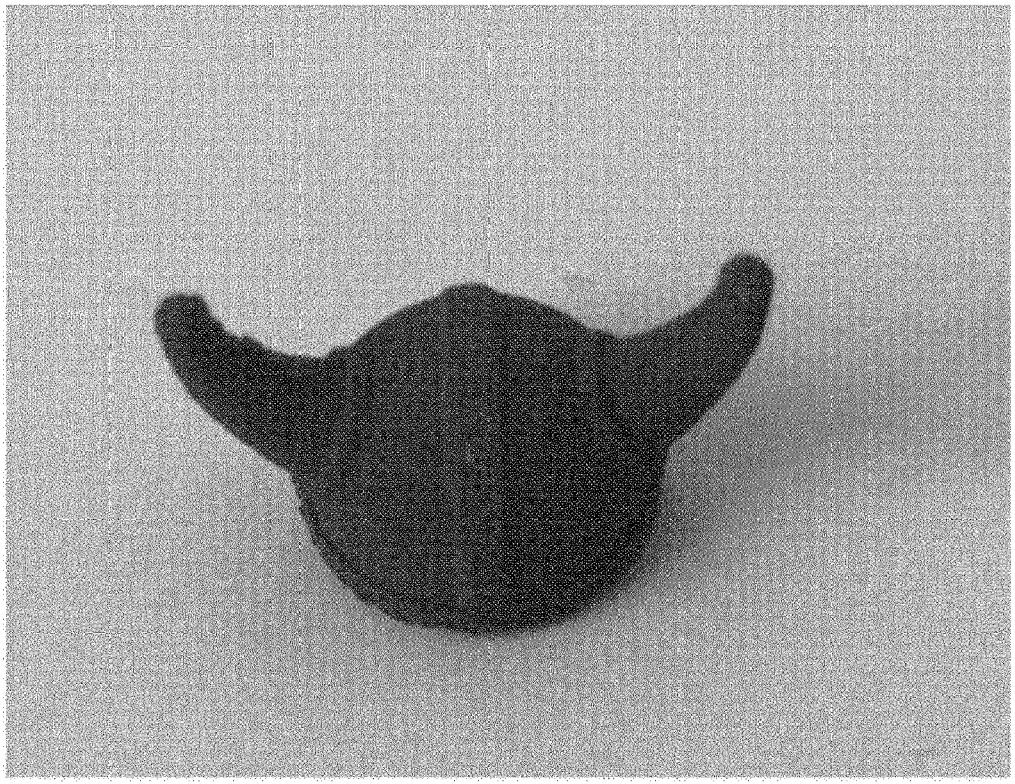
FIG. 4 shows a printed material (green body), in this case a Viking helmet.
Figure 5:
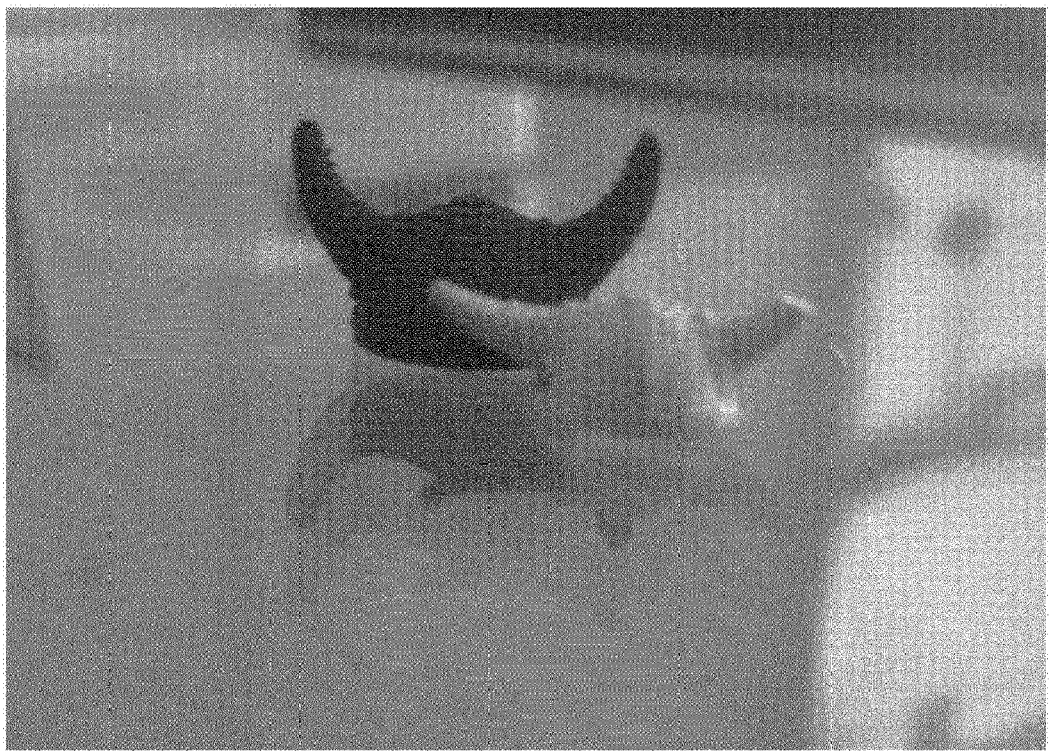
FIG. 5 shows the final sintered part and the green part shown in FIG. 4, for comparison of the respective dimensions.

The feedstocks of Examples 12-15 and 17 to 20, which could successfully be used in the printer employed herein, were used to prepare hollow Viking helmets as shown in FIG. 4. The obtained helmets were then debinded using the temperature profile described above and sintered using the temperature profile described above. The following results were obtained:

TABLE 8

Results of debinding and sintering for the green bodies (helmets) obtained with the feedstocks of Examples 12-15 and 17-20

| Ex. No. | Sinterable Particles | Debinding Finish | Sintering Finish | Overall Rating |
|---|---|---|---|---|
| 12 | Arashk 17-4PH lot E59 | Nice | Nice | A-B |
| 13 | CIP BC | Nice | OK | A-B |
| 14 | Al$_2$O$_3$ | Very nice, big shrinkage, not white due to impurities | Very nice | A |
| 15 | ASC300 | Horns somewhat distorted | Very little shrinkage, but solid | B-C |
| 17 | CP Ti | Strongly oxidized | not sintered | C-D |
| 18 | GAS 316L Carpenter | Heavily distorted | Nice | B-C |
| 19 | Atmix 316L PF3 | Horns somewhat distorted | Very nice, metal gloss | A |
| 20 | TiO$_2$ | Really nice, but not white due to impurities | Really nice, but still not white | A-B |

The distortion observed with the feedstock of Example 18 (GAS 316L Carpenter) is believed to be caused by the spherical shape of the sinterable particles.

The oxidation of the titanium feedstock of Example 17 is believed to have been caused by the combination of a too high partial pressure of oxygen and too high temperatures, or a reaction on the surface of the particles. These problems may be avoided by using lower temperatures, or by using an alternative binder removal process (e.g. by solvent extraction).

Comparative Example 1-Filamet™

The product Filamet™ of The Virtual Foundry consists of copper particles dispersed in polylactic acid, according to information provided on the website of the manufacture. This is in agreement with the IR analysis is FIG. 3b. Polylactic acid has a Tg of 55° C. The inventors obtained this product in order to evaluate its properties vis-à-vis the feedstock of the invention.

When unpacking the Filamet™ spool, it was observed that the surface of the filament was quite rough and brittle. But more noticeable was that the filament already presented some cracks and break points on the spool. This already suggested that it may be impossible to produce larger parts by an FFM method without manually feeding pieces of the filament, which is burdensome and unsuitable for an industrial process.

This expectation was confirmed during subsequent printing tests. The filament was so brittle that it kept breaking while being fed into the print head. In order to print relatively big parts like a TRS bar, it was necessary to stay next to the printer and load the print head manually again when a piece of filament was finished, which was several times per minutes. The printing operation itself was smooth with steady flow and provided a green body with good quality and strength.

One Viking helmet was printed and subjected to the same debinding cycle described above. This cycle differs from the combined debinding and sintering cycle suggested by the manufacture, which combines a debinding treatment with a 1.5 C/min increase between 175 and 345 C and a total debinding time of about 4 hours, immediately followed by a temperature increase at 10 C/min to 927 C and holding this temperature for 90 minutes.

The green part (Viking Helmet) obtained with Filamet™ collapsed completely when using the debinding cycle above. This shows that the brown body has insufficient strength to maintain complex and not self-supporting structures and does not withstand storage or prolonged debinding cycles. Indeed, the full metal part objects shown on the webpage of The Virtual Foundry show cones having a basically self-supporting structure that may be maintained even if the binder is removed.

Yet, a structure like a Viking helmet requires adhesion between the metal particles after the debinding treatment in order to avoid a collapse of the structure due to gravity. Apparently, no such cohesion is provided in Filamet™, and the binder appears to be removed, leaving only the particles that are unable to hold their arrangement, leading to collapse of the structure.

Conversely, the binder composition of the present invention comprises the polymeric compatibilizer having a group capable of interacting with the surface of the sinterable particles. As shown in FIG. 3a, yet without wishing to be bound by theory, it is believed that the compatibilizer coordinates to the sinterable particle and remains to a small extent on the particle surface even after the debinding treatment and is only fully removed in the high-temperature sintering step. The small remaining amount of compatibilizer is further believed to act as kind of glue for the particles, and thus allows maintaining the physical integrity of the brown body even for more complex and not self-supporting structures.

Comparative Examples 2-6 (PMMA and Polylactic Acid Binder)

In order to evaluate whether the addition of a polymeric compatibilizer to other binder components would improve the properties of a feedstock, the following compositions were prepared, using 17-4 PH water atomized precipitation hardened stainless steel sieved at 45 µm. X50=32 µm, with an irregular surface shape (made at North American Hoganas High Alloys) as sinterable particles:

TABLE 9

Binder compositions of Comparative Examples 2-6

| Comp. Ex. | Fusabond P353 [wt %] | PLA 2500HP [wt %] | PLA 3251D [wt %] | PMMA [wt %] | Licomont [wt %] |
|---|---|---|---|---|---|
| 2 | 8 | 92 | — | — | — |
| 3 | 14 | — | — | 86 | — |
| 4 | — | — | 92 | — | 8 |
| 5 | — | 92 | — | — | 8 |
| 6 | 8 | — | 92 | — | — |

In the feedstocks, the above binder compositions were mixed with the sinterable particles such that the amount of sinterable particles is 54 Vol.-%. The materials of the binder composition are as follows:

PLA 2500HP: Polylactic acid, 2500 g/mole purchased from Resinex Nordic AB,

PLA 3251D: Polylactic acid purchased from Resinex Nordic AB

Fusabond P353: Maleic anhydride grafted polypropylene

PMMA: Poly methyl methacrylate purchased from Evonik, Tg 110° C.

Licomont CAV 102P: Calcium salt of montanic acid (linear, aliphatic C24-C36 monocarboxylic acid), purchased from Clariant, common plasticizer for PLA Polylactic acid has a Tg of 55° C.

The feedstocks were produced using a HAAKE Polylab QC mixer. First the binders were mixed with 75% of the metal powder at 190° C. at 100 revolutions per minute and ran for 15 minutes. Then the remaining 25% of metal powder was mixed into the feedstock in the HAAKE Polylab QC mixer and run for another 60 minutes at the same speed and temperature. The feedstock was then cooled and granulated using a Wittman MAS 1 Granulator.

Initial filaments were made using a Göttfert MI-2 Melt Indexer. Longer filaments were made using a Göttfert Rheograph 2003 to test the spooling characteristics of the specimens. The method uses a fixed temperature (155-190° C.) over a cylinder packed with a material which is pressed through a capillary (d=1.7 mm, h=30 mm) at a shear rate of 0.2 mm/s. The material load was around 300 g feedstock per run, varying accordingly to the feedstock density. When the filament came out of the capillary it was manually spooled on plastic spools for 3D-printing. The temperature for each feedstock was estimated based on the binder chemistry and shape and size of the powder and then adapted if needed and/or possible.

All filaments produced with the feedstocks of Comparative Examples 2-6 were able to be extruded in the MFR, however with quite unsatisfying results regarding surface finish, brittleness and the ability to be extruded continuously without breaking. Most of the filaments were somewhat spoolable, but as soon as the temperature decreased they became too brittle to be de-spooled without breaking. Therefore they were not considered suitable for automatic printing without manual feeding.

The feedstocks of comparative Examples 2 and 4 were test printed and failed completely. The others were not printed since they showed to be insufficient already in the earlier process steps. None of the recipes in this study were printable due to high brittleness and the inability to obtain longer filaments.

Polylactic acid is quite hard at room temperature, so that two different plasticizers were used in order to obtain de-spoolability and printability. None of them softened the PLA enough. When PLA melts, it reduces its viscosity quickly, so that it was difficult to match a temperature already when filamentizing. At too high temperatures the flow was too high to obtain a filament, and therefore the feedstock just tended to melt into a lump of material. However when decreasing the temperature just a little bit the PLA became so hard that nothing came through the die.

The recipes that were spoolable only sustained a couple of revolutions before breaking and as soon as the temperature reached room temperature the filaments were so brittle that they broke into very short pieces when trying to despool it. This was also the case for the feedstock of Comparative Example 3, which was PMMA based. It formed acceptable filaments and showed nice surface finish, but was simply too brittle for spooling and further handling.

The results of the Comparative Examples thus show that a feedstock that satisfies the requirements for smooth production of a spooled filament, de-spoolability at room temperature, printability, debindability, sufficient strength of a green body and a brown body and which allows obtaining an all-inorganic sintered body possibly having a complex and not self-supporting shape is difficult to produce. The present invention thus provides an improved feedstock with respect to some or all of these requirements by disclosing the use of a binder composition comprising (b1) a polymeric compatibilizer and (b2) a polymeric binder component being selected from the group consisting of (b2-1) a polymer mixture or polymer alloy comprising a first and second polymer, (b2-2) a block copolymer comprising a first and second polymer block, or (b2-3) mixtures of (b2-1) and (b2-2), as described above and defined in the appended claims.

When in the present invention reference is made to the "sintered density", "porosity percentage" or "relative density" of the sintered part, these define values obtained by the following method, which is performed at room temperature (21° C.):

First the dry weight ($m_{dry}$) Of a sintered part is measured. The part is then put in under vacuum in a vacuum chamber for 30 min, after which the chamber is filled with water (room temperature). The piece is immersed for 30 min before the weight was measured under water, called the wet weight ($m_{wet}$). After determining the wet weight the piece is taken out of the water and the excess of water is dried off using a moist cloth, after which the moist weight ($m_{moist}$) was measured.

The weight ($m_{water}$) and also thereby the volume of water ($V_{water\ in\ pores}$) in the open pores is determined by subtracting the dry weight from the moist weight. The volume of water in the pores is equal to the total volume of the open pores ($V_{pores}$).

$$(m_{water}) = (m_{moist}) - (m_{dry})$$

$$(V_{water\ in\ pores}) = (V_{pores}) = (m_{water})/(P_{water})$$
where $(P_{water}) = 1$ g/ml The total volume of the part ($V_{tot}$) was determined by calculating the volume of water which was displaced by the part when placed in water.

$$(V_{tot}) = (V_{disp.\ water})$$

$$(V_{tot}) = (V_{disp.water}) = (m_{wet})/(P_{water}) - (m_{dry})/(P_{water})$$
where $(\rho_{water}) = 1$ g/ml Simplified: by subtracting the wet weight from the dry weight.

$$(V_{tot}) = (m_{wet}) - (m_{dry})$$

The porosity percentage is determined by dividing the volume of the open porosity ($V_{pores}$) by the whole part volume ($V_{tot}$)

The density of the sintered part ($\beta_{sintered\ part}$) is determined by dividing the dry weight by the volume of the part, and that value is compared to the theoretical maximum density of the powder in order to determine the density:

$$(\rho_{sintered\ part}) = (m_{dry})/(V_{tot})$$

The relative density (expressed in %) of the sintered part is a value relative to the known density of the bulk of the material of the sintered particles. If, for instance, the density of a sintered part made from stainless steel calculated according to the above is 6.5 g/cm³, and the density of the bulk stainless steel is 7.8 g/cm³, the relative density [%] is 6.5/7.8*100=83.33%.

The invention claimed is:

1. A feedstock comprising:
   sinterable particles P made of a metal, metal alloy, glass, ceramic material, or a mixture thereof; and
   a binder composition B comprising:
   5-15% by weight, relative to the total weight of the binder composition, of a polymeric compatibilizer b1; and
   85-95% by weight, relative to the total weight of the binder composition, of a polymeric binder component b2,
   the polymeric binder component b2 being selected from the group consisting of:
   a polymer mixture or polymer alloy b2-1, the mixture or alloy comprising at least a first and a second polymer, the Tg of the first polymer being −20° C. or lower and the Tg of the second polymer being 60° C. or higher;
   at least one block copolymer b2-2, comprising at least a first polymer block and second polymer block, the first polymer block having a Tg in the range of −20° C. or lower and the second polymer block having a Tg of 60° C. or higher; and
   mixtures b2-3 of b2-1 and b2-2,
   wherein the amount of sinterable particles P is 40 Vol.-% or more of the feedstock.

2. The feedstock according to claim 1, wherein the first polymer and the second polymer in b2-1 are both selected from b2-1-1 homopolymers obtained from a (meth)acrylate or (meth)acrylic acid, are both selected from b2-1-2 random copolymers obtained from two or more monomers selected from (meth)acrylic acid and (meth)acrylates, or form a mixture of such homopolymers and copolymers, and/or
   wherein the at least one block copolymer b2-2 is a block copolymer wherein all polymer blocks are obtained from monomers selected from the group consisting of (meth)acrylic acid and (meth)acrylates.

3. The feedstock according to claim 1, wherein the at least one block copolymer b2-2 is selected from diblock copolymers and triblock copolymers.

4. The feedstock according to claim 3, wherein the at least one block copolymer b2-2 is a triblock copolymer of the structure B-A-B, wherein the polymer block A is the first polymer block having a Tg of −20° C. or lower and the polymer block B is the second polymer block having a Tg of 60° C. or higher.

5. The feedstock according to claim 1, wherein said first polymer or said first polymer block having a Tg in the range of −20° C. or lower is obtained from n-butyl acrylate, and said second polymer or said second polymer block having a Tg of 60° C. or higher is obtained from methyl methacrylate.

6. The feedstock according to claim 1, wherein in b2-1 the content of said first polymer having a Tg of −20° C. or lower is in the range from 65 to 95% by weight, and the content of the second polymer having a Tg of 60° C. or higher is in the range of 5 to 35% by weight, based on the total weight of the polymers forming the component b2-1; or
   wherein in the at least one block copolymer b2-2, the content of the first polymer block having a Tg of −20° C. or lower is in the range of 65-95% by weight, and the content of the second polymer block having a Tg in the range of 60° C. or higher is in the range of 5 to 35% by weight, based on the total weight of the block copolymer; or
   wherein when two or more block copolymers b2-2 are used, the content of the first polymer block having a Tg of −20° C. or lower is in the range of 65-95% by weight, and the content of the second polymer block having a Tg in the range of 60° C. or higher is in the range of 5 to 35% by weight, based on the total weight of all block copolymers.

7. The feedstock according to claim 1, wherein the polymeric binder component consists of the at least one block copolymer b2-2 the block copolymer having a structure B-A-B, wherein A is the first polymer block having a Tg of −20° C. or lower and is obtained from n-butyl acrylate and B is the second polymer block having a Tg in the range of 60° C. or higher and is obtained from methyl methacrylate, wherein the content of the first polymer block is in the range of 65-95% by weight, and the content of the second polymer block is in the range of 5-35% by weight, based on the total weight of each block copolymer.

8. The feedstock according to claim 1, wherein the polymeric compatibilizer b-1 is a polymer having in a side chain or in the main chain of the polymer one or more groups selected from a hydroxyl group, an ether group, an oxo group, an ester group, a carboxylic acid group, a carboxylic acid anhydride group, a thiol group, an primary, secondary or tertiary amine group, and an amide group.

9. The feedstock according to claim 8, wherein the polymeric compatibilizer b-1 is a polymer having in a side chain one or more groups selected from a hydroxyl group, a carboxylic acid group, and a carboxylic acid anhydride group.

10. The feedstock according to claim 1, wherein the polymeric compatibilizer b-1 is a carboxylic acid or carboxylic acid anhydride modified polyolefin.

11. The feedstock according to claim 1, wherein the binder composition B consists of the polymeric compatibilizer b-1 and the at least one block copolymer b-2-2 as a binder component, the polymeric compatibilizer b-1 being a carboxylic acid modified polyethylene, a carboxylic acid anhydride modified polyethylene, a carboxylic acid modified polypropylene or a carboxylic acid anhydride modified polypropylene.

12. The feedstock according to claim 1, the feedstock being in the form of a filament or pellet.

13. The feedstock according to claim 1, wherein the sinterable particles P are selected from the group consisting of a metal or metal alloy, and ceramic materials.

14. The feedstock according to claim 1, wherein 95% by weight or more of the sinterable particles P have a diameter of 100 μm or less.

15. An additive manufacturing method comprising the use of the feedstock according to claim 1.

16. An additive manufacturing method, the additive manufacturing method comprising the steps:
   A. forming a first layer of a feedstock as defined in claim 1 on a support;
   B. forming at least one further layer on top of the first layer to form a green body;
   C. preforming a debinding treatment, in order to form a brown body from the green body obtained in step B; and
   D. simultaneously or subsequently to step C, performing a sintering treatment to sinter the sinterable particles P.

17. The method according to claim 16, wherein the thermal debinding treatment in step C comprises a heating treatment that is performed for 2 hours or more, according to a temperature profile that comprises one or more temperature increasing segments and optionally at least one temperature holding segment defining an end temperature, the highest temperature of the heating treatment being in the range of 300-450° C., wherein the average heating rate between 200° C. and the highest temperature is 5° C./minute or less.

18. The method according to claim 16, wherein the thermal debinding step C and/or the sintering step D are performed vacuum, in an inert atmosphere, a reducing atmosphere or air.

* * * * *